US006675314B1

(12) United States Patent
Yamada et al.

(10) Patent No.: US 6,675,314 B1
(45) Date of Patent: Jan. 6, 2004

(54) DATA RECEIVING APPARATUS, A METHOD OF REGENERATING A SOURCE CLOCK TO BE USED FOR THIS, AND A COMPUTER PRODUCT

(75) Inventors: Hirotoshi Yamada, Tokyo (JP); Koichi Nakashima, Tokyo (JP); Kentaro Tanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 595 days.

(21) Appl. No.: 09/702,834

(22) Filed: Nov. 1, 2000

Related U.S. Application Data

(63) Continuation of application No. PCT/JP00/01194, filed on Mar. 1, 2000.

(30) Foreign Application Priority Data

Mar. 1, 1999 (JP) ............................................ 11-053256

(51) Int. Cl.$^7$ .............................. G06F 1/04; G06F 1/12
(52) U.S. Cl. ........................ 713/600; 713/400; 713/503
(58) Field of Search ................................ 713/400, 401, 713/500, 501, 503, 600; 710/52, 57, 58, 60

(56) References Cited

U.S. PATENT DOCUMENTS

| 5,007,070 A | * | 4/1991 | Chao et al. .................. 375/371 |
| 5,128,632 A | * | 7/1992 | Erhart et al. ................. 331/1 A |
| 5,396,492 A | | 3/1995 | Lien |
| 6,172,964 B1 | * | 1/2001 | Whitton ........................ 370/230 |
| 6,219,396 B1 | * | 4/2001 | Owada ......................... 375/372 |
| 6,532,243 B1 | * | 3/2003 | Leijonhufvud .............. 370/503 |

FOREIGN PATENT DOCUMENTS

| JP | 4-322532 | 11/1992 |
| JP | 7-46257 | 2/1995 |
| JP | 9-247156 | 9/1997 |
| JP | 10-271115 | 10/1998 |

OTHER PUBLICATIONS

Proceedings of the General Meeting in 1999, Tsushin 2, B–8–23, (Aug. 3, 1999); The Institute of Electronics, Information and Communication Engineers.

Proceedings of the General Meeting in 1997, Tsushin 2, B–8–23, (Jun. 3, 1997; The Institute of Electronics, Information and Communicaton Engineers.

Proceedings 2 of Communication Society Meeting in 1997, B–8–8, Aug. 13, 1997); The Institute of Electronics, Information and Communication Engineers.

Proceedings 2 of Communication Society Meeting in 1998, B–8–22, (Jul. 9, 1998); The Institute of Electronics, Information and Communication Engineers.

* cited by examiner

Primary Examiner—Dennis M. Butler
(74) Attorney, Agent, or Firm—Birch, Stewart, Kolasch & Birch, LLP.

(57) ABSTRACT

A source clock regenerating section (10) comprises an operating section (2) for taking a weighted average value of a plurality of buffer remaining volumes H that have been sequentially detected, multiplying a predetermined sensitivity coefficient A to this weighted average value, and further adding a predetermined offset value, thereby to obtain a control value U for regenerating the source clock; and an operation control section (5) for setting a local clock (14) to a manipulated variable to be used for calculating the control value capable of converging to the source clock at a high speed during a period from when a source clock regeneration operation has started till when the local clock (14) as a regeneration source clock satisfies a predetermined condition for coming closer to a source clock frequency, and for setting the local clock to the manipulated variable capable of stably regenerating the source clock after this predetermined condition has been satisfied.

19 Claims, 21 Drawing Sheets

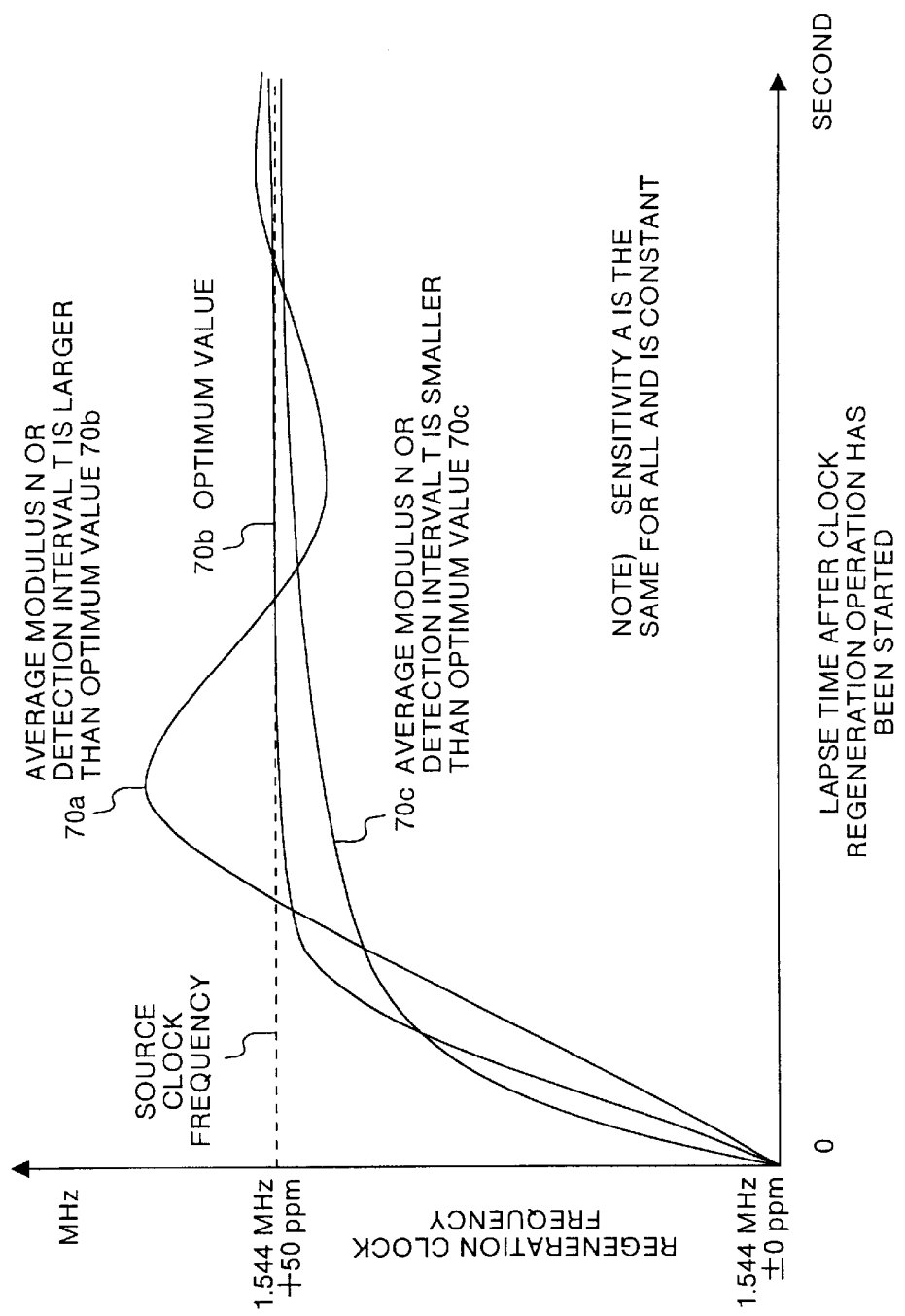

DATA RECEIVING APPARATUS, A METHOD OF REGENERATING A SOURCE CLOCK TO BE USED FOR THIS, AND A COMPUTER PRODUCT

This application is a Continuation of PCT International Application No. PCT/JP00/01194 filed on Mar. 1, 2000, which designated the United States, and on which priority is claimed under 35 U.S.C. §120, the entire contents of which are hereby incorporated by reference.

TECHNICAL FIELD

This invention relates to a data receiving apparatus that regenerates at a receiver side a source clock frequency of a transmitter side particularly when the network clock and the source clock supplied to the transmitter side are mutually asynchronous or when the network clocks supplied to the transmitter side and the receiver side are mutually asynchronous in the communications via an ATM (Asynchronous Transfer Mode) network, a method of regenerating a source clock to be used for this, and, a computer-readable recording medium recorded with a program for making the computer execute the method according to this invention.

BACKGROUND ART

The ATM system collecting attention as the communication system for the multi-media era. This ATM system is characterized in that circuits between terminals are set as logical virtual circuits regardless of each medium while an STM (Synchronous Transfer Mode) system occupies a physical circuit of an STM network at each medium between terminals. Thus, the ATM system can realize an efficient multi-media communication system.

A communication system that employs the STM system will be now explained. FIG. 15 is a diagram that shows a configuration of the communication system realizing a telephone service in the STM network. A transmitter-side device group 45 transmits sound data (data string) to an STM network 47 at a constant speed. A receiver-side device group 46 receives the sound data transmitted from the STM network 47 at a constant speed. The STM network 47 communicates in a synchronous transfer mode, and outputs a network clock 42.

Telephones 40a and 40b are telephones corresponding to ISDN (Integrated Services Digital Network), and these telephones 40a and 40b are connected to PBX (Private Branch Exchanges) 41a and 41b respectively. The PBX 41a operates with a source clock 43, and the PBX 41b operates with a local clock 44. Sound information that has been input to the telephone 40a of the transmitter-side device group 45 is transmitted as sound data to the STM network 47 at a constant speed via the PBX 41a, and is then received by the telephone 10b via the PBX 41b within the receiver-side device group 46.

In the communication system of the STM system shown in FIG. 15, basically all the devices connected to the STM network 47 operate in synchronism with a sole clock frequency. In FIG. 15, a network clock 42 within the STM network 47 becomes a master clock, and the source clock 43 within the PBX 11a and the local clock 44 within the PBX 11b follow this master clock in synchronism.

Further, the sound data (data string) output from the PBX 41a is transmitted to the STM network 47 at a constant speed, for example, at 1.544 Mb/s, by using the source clock 43 within the PBX 41a as a reference. A data type transmitted at this constant speed is called CBR (Constant Bit Rate), and the sound data or the like corresponds to this CBR data, which is the data required to have real time nature.

The PBX 41b within the receiver-side device group 46 receives the sound data transmitted at a constant speed from the STM network 47, using the local clock 44 as a reference. As described above, as the source clock 43 and the local clock 44 are both slave synchronous with the network clock 42, the clock frequencies of the source clock 43 and the local clock 44 are the same as a result. Therefore, the PBX 41b can normally receive the CBR data transmitted from the PBX 41a within the transmitter-side device group 45 without over-flowing or under-flowing an inside receiving buffer not shown.

A communication system that employs the ATM system will be explained. FIG. 16 is the same as FIG. 15 but shows the configuration of a communication system realizing a telephone service in the ATM network. First, in order to realize the STM network 47 in the ATM system, that is, in order to realize by the ATM system the telephone services that are realized in a circuit switching network and a personal circuit, a service for making the ATM network appear as if it is the STM network to the transmitting and receiving devices (terminals) is necessary. That is, what is called a circuit emulation service is necessary.

In this ATM communication system, an ATM network 50 exists as a network in place of the STM network 47. A transmission CLAD (Cell Assembly and Disassembly) 51 is provided between this ATM network 50 and the transmitter-side device group 45, and a reception CLAD 52 is provided between the ATM 50 and the PBX 41b within the receiver-side device group 46. Other components are the same as those in FIG. 15. Those components that are the same as the components shown in FIG. 15 have been provided with identical legends. The above-described circuit emulation service is carried out by using the transmission CLAD 51 and the reception CLAD 52.

The ATM network 50 shown in FIG. 16 carries out communications in the asynchronous transfer mode, and transmits in an ATM cell unit that is divided into 53-byte fixed-length packets. The transmitter-side device group 45 transmits sound data to the ATM network 50 in a cell format (ATM cell) at a constant speed. The receiver-side device group 46 receives the ATM cell transmitted from the ATM network 50 at a constant speed. The ATM network 50 has network clocks 42a and 42b. The telephones 40a and 40b are ISDN telephones. The PBX's 41a and 41b operate with the source clock 43 and the local clock 44 respectively. The transmission CLAD 51 converts a series of data string into an ATM cell, and the reception CLAD 52 converts the received ATM cell into a series of data string.

The sound information that has been input through the telephone 40a within the transmitter-side device group 45 is input as sound data (data string) to the transmission CLAD 51 via the PBX 41a, and is changed into an ATM cell in this transmission CLAD 51. Thereafter, this ATM cell is transmitted to the ATM network 50 at a constant speed. After that, the ATM cell is received by the reception CLAD 52 within the receiver-side device group 46, and this ATM cell is returned to the original data string in this reception CLAD 52, and then the data string is received by the telephone 40b via the PBX 41b.

In this ATM communication system, devices within the ATM network 50, for example, all the devices including the ATM switching unit do not necessarily operate in synchronism with a sole frequency clock, unlike in the STM communication system. In other words, a sole frequency clock that can be commonly used is not necessarily supplied to all the devices connected to the ATM network 50. In this sense, two network clocks 42a and 42b exist within the ATM network 50 shown in FIG. 16, and the frequencies of these two network clocks 42a and 42b are not necessarily synchronous with each other.

In the mean time, in order to carry out a normal communication between the two PBX's 41a and 41b, it is necessary to transmit and receive data at a constant speed based on the same frequency clock as a reference. For this purpose, it is necessary to post the frequency of the source clock 43 within the PBX 41a to the PBX 41b and to match the frequency of the local clock 44 within the PBX 41b with the source clock 43 by some means.

At ITU advice I.363.1 B-ISDN ATM Adaptation Layer specification: Type 1 AAL, ITU-T (Telecommunication Standardization Sector of International Telecommunication Union) defines a function that matches the frequency of the local clock with the source clock as a source clock frequency regeneration function. In other words, this is a function of regenerating at a receiver user side the source clock frequency of a transmitter user side between the transmitter user and the receiver user who are connected to each other via the ATM network.

Further, as one of the source clock frequency generation methods, the adaptive clock method has been prescribed. This adaptive clock method is used based on a pre-condition that a data transfer speed is constant (CBR) and that a range of this transfer speed is already known to the transmitter side and the receiver side. A mechanism for realizing the adaptive clock method is installed at only the receiver side. In other words, nothing is required to be installed at the transmitter side, and there is no special control information to be exchanged between the transmitter and the receiver at all.

In this case, that the range of the data transfer speed is already known to the transmitter side and the receiver side means that both the transmitter and the receiver know in advance that a data transfer speed is, for example, 1.544 Mb/s±100 ppm. Then, the receiver side calculates by using the adaptive clock method a specific value of the data transfer speed of the transmitter side, that is, the source clock frequency within the range of 1.544 Mb/s±100 ppm.

The concept of the operation of this adaptive clock method will be explained with reference to FIG. 17. A source clock regeneration buffer 23 is provided within an AAL processing section 20 to be described later for carrying out an AAL (ATM Adaptation Layer) processing in an ATM layer structure.

At the receiver side, reception cells 60a to 60c are written sequentially into the source clock regeneration buffer 23, and a buffering is carried out to a read starting threshold value TH that is a center value (½) of the total capacity of the source clock regeneration buffer 23. Thereafter, the reception cells 60a to 60c are read out sequentially from the source clock regeneration buffer 23 by using the local clock 44. According to the adaptive clock method, control information for controlling the frequency of the local clock 44 is calculated based on a buffer remaining volume within the source clock regeneration buffer 23.

When the empty space in the buffer (hereafter, buffer remaining volume) is in an increasing trend, the frequency of the local clock 44 is considered to be lower than the source clock 43. Therefore, the frequency of the local clock 44 is controlled to be increased. On the other hand, when the buffer remaining volume is in a decreasing trend, the frequency of the local clock 44 is controlled to be decreased.

In the ITU-T advice, only the above operation concept of the Adaptive clock method is indicated, and almost nothing is described about a detailed specification for realizing this method and a method of calculating this control information.

A conventional data receiving apparatus having a source clock frequency generation function and the Adaptive clock method will be explained here. FIG. 18 is a block diagram showing a detailed structure of the reception CLAD 52 having the source clock frequency generation function. In this reception CLAD 52, a physical layer processing section 18 processes a physical layer in an ATM layer structure. An ATM layer processing section 19 carries out an ATM layer processing in the ATM layer structure. An AAL processing section 20 carries out an AAL processing in the ATM layer structure. An STM processing section 21 carries out an STM interface finish processing in an STM. A device managing section 22 carries out an overall device management of the reception CLAD 52.

FIG. 19 is a block diagram showing a detailed structure of the AAL processing section 20. In this AAL processing section 20, a source clock regeneration buffer 23 temporarily holds a reception cell. A source clock regenerating section regenerates the source clock. A buffer control section 11 controls the reading from the source clock regeneration buffer 23. A buffer-remaining volume monitoring section 12 obtains a buffer remaining volume H from a write signal and a read signal to the source clock regeneration buffer 23, and monitors this buffer remaining volume H. A control-voltage calculating section 1 calculates a control voltage V to a voltage control crystal oscillator 13 to be described later based on the buffer remaining volume H output from the buffer-remaining volume monitoring section 12. The voltage control crystal oscillator (VCXO) 13 changes an oscillation frequency (local clock 44) according to the control voltage V from the control-voltage calculating section 1.

FIG. 20 is a block diagram showing a detailed structure of the control-voltage calculating section 1. In this control-voltage calculating section 1, an operating section 2 calculates a control value U from the buffer remaining volume H that is output from the buffer-remaining volume monitoring section 12. A D/A converter 3 converts the control value U that is a digital value output from the operating section 2 into a control voltage V that is an analog value. A timer 4 instructs the operating section 2 to execute the operation at each constant cycle.

The device managing section 22 shown in FIG. 18 manages the overall devices in the reception CLAD 52, and sets various parameters to and collects statuses from the physical layer processing section 18, the ATM layer processing section 19, the AAL processing section 20, and each section 18 to 21 of the STM processing section 21 respectively. In order to realize this function, the device managing section 22 and each of the sections 18 to 21 are connected by a control bus.

Further, in order to set various parameters and to collect statuses as described above, this control bus is also connected to sub-blocks not shown within each of the sections 18 to 21, such as, for example, sub-blocks within the AAL processing section 20. A data bus width at an ATM interface and an STM interface is serial (1 bit) respectively, but data is transmitted and received generally in the width of 8 bits within each of the sections 18 to 21.

For example, when the ATM interface speed is 155.52 MHz, the STM interface speed, that is a source clock frequency, is 1.544 MHz, and its variation range is ±100 ppm, an interface is carried out in the 8-bit width within the reception CLAD 52 as described above. As most of them operate in the clock of the ATM interface system, the inside reference clock becomes 19.44 MHz (=155.52 MHz/8 bits).

Referring now to FIG. 16, the sound data that has been output from the telephone 40a within the transmitter-side device group 45 is input to the transmission CLAD 51 via the PBX 41a, and is converted in to an ATM cell here, and is thereafter transmitted to the ATM network 50 at a constant speed. Thereafter, the ATM cell is transmitted to the receiver-side device group 46 from the ATM network 50 at a constant speed.

The ATM cell that has been transmitted from the ATM network 50 to the receiver-side device group 46 is received by the reception CLAD 52. In other words, as shown in FIG. 18, the ATM cell is input to the physical layer processing section 18 via the ATM interface. This physical layer processing section 18 carries out a physical layer processing of SDH (Synchronous Digital Hierarchy)/SONET (Synchronous Optical Network), and cell synchronization, and a serial/parallel (8-bit) conversion.

The data processed by the physical layer processing section 18 is sent to the ATM layer processing section 19. The ATM layer processing section 19 carries out an ATM layer processing such as a filtering based on VPI (Virtual Path Identifier)/VCI (Virtual Channel Identifier), and then delivers the data to the AAL processing section 20.

In general, the CBR data such as the sound data is transmitted by utilizing an AAL type 1. Therefore, the AAL processing section 20 carries out the AAL type 1 processing such as a cell abandon/erroneous insertion check processing, a fluctuation absorption processing, a conversion from an ATM cell to a data string, and a source clock frequency regeneration processing, according to a sequence number within the header of the AAL type 1. In this AAL processing, the frequency of the source clock 43 as the STM interface clock is regenerated.

The sound data that has been converted into the data string by the AAL processing section 20 is further sent to the STM processing section 21. The data string is then subjected to an STM interface finishing processing such as an STM frame generation, and a parallel (8-bit) /serial conversion by the STM processing section 21. Thereafter, the data string is transmitted to the PBX 41b via the STM interface. Next, details of the source clock frequency regeneration operation in the AAL processing section 20 will be explained.

First, within the AAL processing section 20, reception cells 60a to 60c that have been input from the ATM layer processing section 19 are written into a source clock regeneration buffer 23 based on a write signal. In this case, sound data of an effective speed 1.544 Mb/s is transferred between blocks at a data transfer speed of 155.52 Mb/s. Therefore, the transfer state of the reception cells 60a to 60c at this time becomes in a burst shape in a cell unit as shown in FIG. 3(a). The buffer-remaining volume monitoring section 12 monitors a write signal from the ATM layer processing section 19, and monitors that the sound data is buffered to the read starting threshold value TH that is set to the center value (½) of the total capacity of the source clock regeneration buffer 23.

When the buffer-remaining volume monitoring section 12 has detected that the sound data has been buffered to the read starting threshold value TH, the buffer-remaining volume monitoring section 12 gives a start instruction S to the buffer control section 11 to start the reading from the source clock regeneration buffer 23, and at the same time instructs the control-voltage calculating section 1 to start the operation.

Thereafter, the operating section 2 within the control-voltage calculating section 1 calculates the control value U based on the buffer remaining volume H sent from the buffer-remaining volume monitoring section 12, according to the operation execution instruction sent from the timer 4 at a constant cycle. The buffer-remaining volume monitoring section 12 thereafter continuously obtains the buffer remaining volume H from the operation of the write signal and the read signal, and posts this buffer remaining volume H to the control-voltage calculating section 1.

As the reading from the source clock regeneration buffer 23 is carried out at the effective speed of the sound data 1.544 Mb/s, the transfer state of the reception cells 60a to 60c becomes in a continuous data string as shown in FIG. 3(b). The difference in the lengths of the reception cells 60a to 60c between those shown in FIG. 3(a) and those shown in FIG. 3(b) is due to the difference in data transfer speeds between the two cases. The data sizes for these are all the same.

When the buffer remaining volume H is in the increasing trend, the control-voltage calculating section 1 regards the frequency of the local clock 44 to be lower than the source clock 43, and controls the voltage control crystal oscillator 13 to increase the frequency of the local clock 44. On the other hand, when the buffer remaining volume H is in the decreasing trend, the control-voltage calculating section 1 controls to lower the frequency of the local clock 44. The voltage control crystal oscillator 13 changes the oscillation frequency of the local clock 44 according to the control voltage V from the control-voltage calculating section 1. The buffer control section 11 outputs a read signal to the source clock regeneration buffer 23 based on the local clock 44 output from the voltage control crystal oscillator 13.

Referring now to FIG. 20, in the control-voltage calculating section 1, the operating section 2 calculates the control value U from the buffer remaining volume H according to the operation execution instruction from the timer 4, and posts this control value U to the D/A converter 3. An equation used for obtaining the control value U in the operation section 2 is, for example, as follows:

Control value $U$=sensitivity $A$×(weighted average value $M$ of (buffer remaining volume $H$−center value $C$))+offset value $B$ (1)

In this case, sensitivity A is a coefficient for converting the weighted average value M into the control value U. When this value is larger, the oscillation frequency of the local clock 44 comes to react sensitively to changes in the weighted average value M, and the convergence time also becomes shorter. The offset value B is a value for outputting the reference frequency to the voltage control crystal oscillator 13. For example, when the frequency variable range is 1.544 MHz±100 ppm, this is a value for outputting 1.544 MHz±100 ppm that is the center frequency thereof. Further, the center value C means the center value (½) of the total capacity of the source clock regeneration buffer 23, and this is the same value as the read starting threshold value TH.

The buffer remaining volume H is not limited to a buffer remaining volume displayed in a detailed number of bytes or number of bits, but may also be a value displayed in any optional unit such as 48 bytes and 64 bytes. For example, 64 bytes may be used as a minimum unit.

The control value U as a digital value calculated by through equation (1) is converted into the control voltage V as an analog value by the D/A converter 3, and a result is used for increasing or decreasing the frequency of the local clock 44 that is the output of the voltage control crystal oscillator 13.

The outline of the above-described source clock frequency generation operation is summarized as follows for easy understanding.

(1) When the weighted average value M is 0, the reference frequency (±0 ppm) is output.

(2) When the weighted average value M is larger (plus) than 0, a frequency higher than the reference frequency is output.

(3) When the weighted average value M is much larger than 0, a higher frequency is output.

(4) When the weighted average value M is smaller (minus) than 0, a frequency lower than the reference frequency is output.

(5) When the weighted average value M is much lower than 0, a lower frequency is output.

The local clock 44 that is frequency-synchronized with the source clock 43 is output from the voltage control crystal oscillator 13 based on the source clock frequency generation operation. The buffer control section 11 outputs the read signal to the source clock regeneration buffer 23 based on the local clock 44, and the ATM cell is read from the source clock regeneration buffer 23 based on this read signal.

Japanese Patent Application Laid-open No. 10-271115, discloses a method of realizing the adaptive clock method in detail. A smoothing buffer is proved at a pre-stage of the source clock regeneration buffer to suppress a sudden variation in the buffer remaining volume of the source clock regeneration buffer, thereby to stabilize the regeneration clock frequency.

Japanese Patent Application Laid-open No. 9-247156 also discloses a method of realizing the adaptive clock method. A regeneration clock frequency is calculated from the buffer remaining volume of the source clock regeneration buffer.

Japanese Patent Application Laid-open No. 7-46275 also discloses a method of realizing the adaptive clock method. A change volume in a deviation of the buffer remaining volume is monitored, and a regeneration clock frequency is calculated using a program of a microprocessor based on a result of this monitoring, thereby open-loop controlling the regeneration clock frequency.

The local clock 44 at the receiver side, that is the convergence time of the regeneration clock, and the frequency stability after the convergence in the above-described conventional ATM communication system are in an inversely proportional (tradeoff) relationship. In other words, as the sensitivity A in equation (1) is made larger, the oscillation frequency of the regeneration clock reacts sensitively to the change in the average value M. As a result, the convergence time becomes short, but at the same time, the oscillation frequency also reacts sensitively to the noise component such the arrival fluctuation of reception cells and a variation in the buffer remaining volume H due to the burst writing of the reception cells into the source clock regeneration buffer 23. Therefore, the frequency stability after the convergence is aggravated. On the other hand, when the sensitivity A in equation (1) is made smaller, the noise component becomes dull, and the frequency stability after the convergence is improved. However, the convergence time becomes longer.

Thus, there has been a problem in the conventional source clock regeneration method that, either the shortening of the convergence time or the frequency stability after the convergence has to be sacrificed.

FIG. 21 shows a detailed example of a state of change in the regeneration clock frequency in relation to a lapse time after starting the clock regeneration operation when the source clock frequency is 1.544 MHz+50 ppm and the initial value of the regeneration clock frequency is 1.544 MHz±0 ppm. Convergence curves 70a to 70c show representative convergence curves when the sensitivity A in equation (1) is the same and constant, and the average modulus N that shows the total number of the buffer remaining volume H used for calculating the weighted average value M and the value of the detection interval T of the buffer remaining volume H have been changed respectively. Among these convergence curves 70a to 70c, the convergence curve 70b is the most ideal convergence curve, with the shortest convergence time as well. The convergence curve 70a shows a case where the average modulus N or the detection interval T is larger than the convergence curve 70b. On the other hand, the convergence curve 70c shows a case where the average modulus N or the detection interval T is smaller than the convergence curve 70b. In both cases, the convergence time is slow.

A combination of the sensitivity A, the average modulus N and the detection interval T that makes it possible to obtain the ideal convergence curve shown in the convergence curve 70b, that is an optimum solution, exists by a plurality of sets in one system. However, in each of these optimum solutions existing by a plurality of sets, the sensitivity A, the average modulus N and the detection interval T are mutually in an inversely proportional relationship. When two values out of these three values have been determined, the remaining one value is also uniquely determined. This is expressed by the following expressing (2).

$$\text{Sensitivity } A \times \text{average modulus } N \times \text{detection interval } T = \text{constant} \quad (2)$$

The convergence time of the optimum solution basically depends on only the value of the sensitivity A.

The weighted average calculation has a work as a low-pass filter that removes the noise component of the higher harmonics and suppresses unnecessary variations in the regenerated clock frequency. Further, as the average modulus N is made larger, that is, as the weight of the latest buffer remaining volume H is made smaller, the cutoff frequency of the low-pass filter becomes smaller, thereby improving the frequency stability after the convergence.

As a result, in order to shorten the convergence time of the regeneration clock frequency and further to improve the frequency stability after the convergence, it can be known that both the sensitivity A and the average modulus N may be made as large values as possible.

However, when the average modulus N is made larger, the scale of the operating circuit of the control value U (operating volume in the case of operating by software) also becomes larger. Further, as long as the constraint (constraint to obtain an optimum solution) shown in equation (2) holds, the detection interval T needs to be made smaller when the sensitivity T and the average modulus N are made larger. This also results in an increase in the operation speed of the operating circuit (frequency of operation in the case of operating by software) Usually, there is an upper limit to the scale and operation speed of the operating circuit that can be actually realized. Therefore, there is a case where it is not possible to obtain a circuit that can satisfy both a required convergence time and required frequency stability, due to this limit.

Therefore, when the scale of the operating circuit and the operation speed of the operating circuit are additionally taken into account, the above-described conventional source clock regeneration method has had a problem that any one of the convergence time, the frequency stability after the convergence, the scale of the operating circuit, and the operation speed of the operating circuit has to be sacrificed.

Further, although the transmission interval of the transmission cells transmitted from the transmission CLAD 51 to the ATM network 50 is constant, the reception intervals of reception cells that are received by the reception CLAD 52 or the source clock regeneration buffer 23 is not constant and has a high possibility of being fluctuated due to the variation in the transfer delay within the ATM network 50. In order to normally convert the ATM cells into a data string in the reception CLAD 52, it is necessary to absorb this delay fluctuation of the reception cell by some means. As one method of realizing this, there is considered a method of making the source clock regeneration buffer 23 bear a function as a fluctuation absorption buffer. In this case, the fluctuation proof of the data receiving apparatus basically depends on the capacity of the source clock regeneration buffer 23.

The fluctuation proof strictly becomes one of a smaller value of the "buffer remaining volume" and the "total capacity of the source clock regeneration buffer 23-buffer remaining volume". In other words, the fluctuation proof becomes a maximum when the buffer remaining volume is equal to the center value (½) of the total capacity of the source clock regeneration buffer 23. When the buffer remaining volume is deviated from the center value, the fluctuation proof is lower, or an overflow or an underflow occurs easily. However, as shown in equation (1), according to the conventional source clock regeneration method, the oscillation frequency of the regeneration clock is controlled using the weighted average value M of the "deviation from the center value of the buffer remaining volume". Therefore, the conventional source clock regeneration method has had a problem that as the source clock frequency is farther from the reference frequency, the weighted average value M becomes farther from 0. In other words, the center of the variation of the buffer remaining volume becomes farther from the center value, which results in the lowering of the fluctuation proof.

Therefore, it is an object of the present invention to obtain a data receiving apparatus that can reduce a convergence time of a regeneration clock, that can increase the frequency stability after a convergence, and that can suppress the influence of the source clock frequency given to the fluctuation proof to a minimum, under a limit to the scale of the operating circuit or to the operation speed of the operating circuit, a method of regenerating a source clock to be used therefor, and a computer-readable recording medium recorded with a program for making a computer execute this method.

DISCLOSURE OF THE INVENTION

A data receiving apparatus relating to this invention is characterized in that it comprises a buffer unit for holding data that has been transmitted from a data transmitting apparatus to a transfer network at a constant speed based on a source clock, and that is then received from the transfer network at a constant speed; and a source clock regenerating unit for detecting a buffer remaining volume that is a data volume held by the buffer unit, and for regenerating the source clock according to this buffer remaining volume. The source clock regenerating unit comprises an operating unit for taking a weighted average value of a plurality of buffer remaining volumes that have been sequentially detected, multiplying a predetermined sensitivity coefficient to this weighted average value, and further adding a predetermined offset value, thereby to obtain a control value for regenerating the source clock; and a control unit for setting a regeneration clock to a manipulated variable to be used for calculating the control value capable of converging to the source clock at a high speed during a period from when a source clock regeneration operation has started till when the regeneration clock satisfies a predetermined condition for coming closer to the source clock frequency, and for setting the regeneration clock to the manipulated variable capable of stably regenerating the source clock after this predetermined condition has been satisfied.

According to this invention, the operating unit takes a weighted average value of the plurality of buffer remaining volumes sequentially detected, and multiplies a predetermined sensitivity coefficient to this weighted average value, and further adds a predetermined offset value, thereby to obtain a control value for regenerating the source clock. In this case, the control unit sets a regeneration clock to a manipulated variable to be used for calculating the control value capable of converging to the source clock at a high speed during a period from when a source clock regeneration operation has started till when the regeneration clock satisfies a predetermined condition for coming closer to the source clock frequency, and sets the regeneration clock to the manipulated variable capable of stably regenerating the source clock after this predetermined condition has been satisfied, thereby regenerating the source clock.

A data receiving apparatus relating to the next invention is characterized in that, in the above invention, the control unit has a timer for counting a pre-decided duration of time (hereafter, constant time), and the predetermined condition is a lapse of the constant time counted by the timer. According to this invention, a high-speed convergence to the source clock frequency is carried out until when a constant time counted by the timer has passed, and a clock regeneration control of high frequency stability is carried out by the lapse of this constant time.

A data receiving apparatus relating to the next invention is characterized in that, in the above invention, the control unit has a time measuring unit for counting a frequency variation range of the regeneration clock, and the predetermined condition is that the frequency variation range of the regeneration clock becomes equal to or lower than a predetermined value. According to this invention, a high-speed convergence to the source clock frequency is carried out until when the frequency variation range of the regeneration clock becomes equal to or lower than a predetermined value. A clock regeneration control of high frequency stability is carried out when the frequency variation range of the regeneration clock has become equal to or lower than the predetermined value.

A data receiving apparatus relating to the next invention is characterized in that, in the above invention, the control unit has a timer for counting a constant time and a time measuring unit for counting a frequency variation range of the regeneration clock, and the predetermined condition is to satisfy one of that the constant time counted by the timer has lapsed and that the frequency variation range of the regeneration clock becomes equal to or lower than a predetermined value. According to this invention, a highspeed convergence to the source clock frequency is carried out until when one of the conditions that a constant time passes and that the frequency variation range of the regeneration clock becomes equal to or lower than a predetermined value is satisfied. A clock regeneration control of high frequency stability is carried out after one of the conditions has been satisfied.

A data receiving apparatus relating to the next invention is characterized in that, in the above invention, the control unit sets the sensitivity coefficient to a small value and at the same time further adds a predetermined correction value to the offset value, after the predetermined condition has been satisfied. According to this invention, before satisfying the predetermined condition, the sensitivity coefficient is set large so that the convergence time becomes short. After the predetermined condition has been satisfied, the sensitivity coefficient is set small, and at the same time a predetermined correction value is further added to the offset value, thereby carrying out a source clock regeneration control of high frequency stability.

A data receiving apparatus relating to the next invention is characterized in that, in the above invention, the control unit sets small the weight of the buffer remaining volume at the latest side out of the plurality of buffer remaining volumes used for the calculation of the weighted average value, after the predetermined condition has been satisfied. According to this invention, the weight of the buffer remaining volume at the latest side is set small from out of the plurality of buffer remaining volumes used for the calculation of the weighted average value, after the predetermined condition has been satisfied.

A data receiving apparatus relating to the next invention is characterized in that, in the above invention, the control unit changes a predetermined interval for detecting the buffer remaining volume, after the predetermined condition has been satisfied. According to this invention, a predetermined interval for detecting the buffer remaining volume is changed, after the predetermined condition has been satisfied.

A data receiving apparatus relating to the next invention is characterized in that, in the above invention, the control unit further adds a predetermined correction value to the buffer remaining volume of the latest side out of the plurality of buffer remaining volumes used for the calculation of the weighted average value, after the predetermined condition has been satisfied. According to this invention, a predetermined correction value is further added to the buffer remaining volume of the latest side out of the plurality of buffer remaining volumes used for the calculation of the weighted average value, after the predetermined condition has been satisfied.

A data receiving apparatus relating to the next invention is characterized in that, in the above invention, the correction value is a time threshold value that changes along with a lapse of time toward a final value after the final value has been decided. According to this invention, the correction value is a time threshold value that changes along with a lapse of time toward a final value after the final value has been decided.

A data receiving apparatus relating to the next invention is characterized in that, in the above invention, the control unit sets a multiplication value of the sensitivity coefficient, an average modulus for prescribing the weighted average calculation of the plurality of buffer remaining volumes, and the predetermined interval, to a constant value corresponding to an optimum value. According to this invention, a multiplication value of the sensitivity coefficient, the average modulus, and the predetermined interval is set to a constant value corresponding to an optimum value.

A data receiving apparatus relating to the next invention is characterized in that, in the above invention, the control unit carries out a plurality of processing in combination from out of the processing of setting the sensitivity coefficient to a small value and at the same time further adding a predetermined correction value to the offset value, the processing of setting small the weight of the buffer remaining volume at the latest side out of the plurality of buffer remaining volumes used for the calculation of the weighted average value, the processing of changing a predetermined interval for detecting the buffer remaining volume, and the processing of further adding a predetermined correction value to the buffer remaining volume of the latest side out of the plurality of buffer remaining volumes used for the calculation of the weighted average value, after the predetermined condition has been satisfied.

According to this invention, the control unit carries out a plurality of processing in combination from out of the processing of setting the sensitivity coefficient to a small value and at the same time further adding a predetermined correction value to the offset value, the processing of setting small the weight of the buffer remaining volume at the latest side out of the plurality of buffer remaining volumes used for the calculation of the weighted average value, the processing of changing a predetermined interval for detecting the buffer remaining volume, and the processing of further adding a predetermined correction value to the buffer remaining volume of the latest side out of the plurality of buffer remaining volumes used for the calculation of the weighted average value, after the predetermined condition has been satisfied.

A data receiving apparatus relating to the next invention is characterized in that, in the above invention, the control unit adds a predetermined correction value to the buffer remaining volume of the latest side out of the plurality of buffer remaining volumes used for the calculation of the weighted average value, after the predetermined condition has been satisfied, and carries out one or more processing in combination from out of the processing of setting the sensitivity coefficient to a small value and at the same time further adding a predetermined correction value to the offset value, the processing of setting small the weight of the buffer remaining volume at the latest side out of the plurality of buffer remaining volumes used for the calculation of the weighted average value, and the processing of changing a predetermined interval for detecting the buffer remaining volume, after the predetermined condition has been satisfied.

According to this invention, the control unit adds a predetermined correction value to the buffer remaining volume of the latest side out of the plurality of buffer remaining volumes used for the calculation of the weighted average value, after the predetermined condition has been satisfied, and carries out one or more processing in combination from out of the processing of setting the sensitivity coefficient to a small value and at the same time further adding a predetermined correction value to the offset value, the processing of setting small the weight of the buffer remaining volume at the latest side out of the plurality of buffer remaining volumes used for the calculation of the weighted average value, and the processing of changing a predetermined interval for detecting the buffer remaining volume, after the predetermined condition has been satisfied.

A data receiving apparatus relating to the next invention is characterized in that, in the above invention, when the frequency variation range of the regeneration clock has exceeded a predetermined value, the control unit returns the regeneration clock to an initial set state of before starting the source clock regeneration operation, sets the regeneration clock to a manipulated variable to be used for calculating the control value capable of converging the source clock at a high speed during a period from this initial set state till when the regeneration clock satisfies a predetermined condition for coming closer to the source clock frequency, and sets the regeneration clock to the manipulated variable capable of stably regenerating the source clock after this predetermined condition has been satisfied.

According to this invention, when the frequency variation range of the regeneration clock has exceeded a predetermined value, the control unit returns the regeneration clock to an initial set state before starting the source clock regeneration operation, sets the regeneration clock to a manipulated variable to be used for calculating the control value capable of converging the source clock at a high speed during a period from this initial set state till when a regeneration clock satisfies a predetermined condition for coming closer to the source clock frequency, and sets the regeneration clock to the manipulated variable capable of stably regenerating the source clock after this predetermined condition has been satisfied.

A data receiving apparatus relating to the next invention is characterized in that, in the above invention, the data receiving apparatus further comprises a setting unit for setting the contents of the setting control that the control unit carries out. According to this invention, it is possible to set the contents of the setting control that the control unit carries out, by using the setting unit.

A source clock regeneration method relating to the next invention is characterized in that, the source clock regeneration method is for holding data that has been transmitted from a data transmitting apparatus to a transfer network at a constant speed based on a source clock and the data received from the transfer network at a constant speed, for detecting a buffer remaining volume that is a data volume held by the buffer unit, and for regenerating the source clock according to this buffer remaining volume. The source clock regeneration method comprises a first step of taking a weighted average of a plurality of buffer remaining volumes sequentially detected during a period from when a source clock regeneration operation has been stated till when a regeneration clock has satisfied a predetermined condition for coming closer to the source clock, multiplying a predetermined coefficient to this weighted average value, further adding a predetermined offset value thereby to obtain a control value for regenerating the source clock, outputting the calculated control value and converging the frequency of the regeneration clock to the source clock at a high speed; and a second step of change setting a manipulated variable to be used for the calculation of the control value after satisfying the predetermined condition, and stably controlling the regeneration of the frequency of the regeneration clock.

According to this invention, first, a weighted average of a plurality of buffer remaining volumes sequentially detected is taken during a period from when a source clock regeneration operation has been stated till when a regeneration clock has satisfied a predetermined condition for coming closer to the source clock, then a predetermined coefficient is multiplied to this weighted average value, further a predetermined offset value is added thereby to obtain a control value for regenerating the source clock, the calculated control value is output and the frequency of the regeneration clock is converged to the source clock at a high speed, and next, a manipulated variable to be used for the calculation of the control value is changed after satisfying the predetermined condition, and the regeneration of the frequency of the regeneration clock is stably controlled.

A source clock regeneration method relating to the next invention is characterized in that, in the above invention, the predetermined condition is a lapse of a constant time after the source clock regeneration operation has been started. According to this invention, a high-speed convergence to the source clock frequency is carried out until when a constant time counted by the timer has passed, and a clock regeneration control of high frequency stability is carried out by the lapse of this constant time.

A source clock regeneration method relating to the next invention is characterized in that, in the above invention, the predetermined condition is that a frequency variation range of the regeneration clock becomes equal to or lower than a predetermined value. According to this invention, a high-speed convergence to the source clock frequency is carried out until when the frequency variation range of the regeneration clock becomes equal to or lower than a predetermined value. A clock regeneration control of high frequency stability is carried out when the frequency variation range of the regeneration clock has become equal to or lower than the predetermined value.

A source clock regeneration method relating to the next invention is characterized in that, in the above invention, the predetermined condition is to satisfy one of that a constant time has passed after the source clock regeneration operation has been started and that a frequency variation range of the regeneration clock becomes equal to or lower than a predetermined value. According to this invention, a high-speed convergence to the source clock frequency is carried out until when one of the conditions that a constant time passes and that the frequency variation range of the regeneration clock becomes equal to or lower than a predetermined value is satisfied. A clock regeneration control of high frequency stability is carried out after one of the conditions has been satisfied.

A source clock regeneration method relating to the next invention is characterized in that, in the above invention, the change setting of the manipulated volume at the second step is setting the sensitivity coefficient to a small value and at the same time further adding a predetermined correction value to the offset value. According to this invention, the change setting of the manipulated volume at the second step is setting the sensitivity coefficient to a small value and at the same time further adding a predetermined correction value to the offset value.

A source clock regeneration method relating to the next invention is characterized in that, in the above invention, the change setting of the manipulated volume at the second step is setting small the weight of the buffer remaining volume at the latest side out of the plurality of buffer remaining volumes used for the calculation of the weighted average value. According to this invention, the change setting of the manipulated volume at the second step is setting small the weight of the buffer remaining volume at the latest side out of the plurality of buffer remaining volumes used for the calculation of the weighted average value.

A source clock regeneration method relating to the next invention is characterized in that, in the above invention, the change setting of the manipulated volume at the second step is changing a predetermined interval for detecting the buffer remaining volume. According to this invention, the change setting of the manipulated volume at the second step is changing a predetermined interval for detecting the buffer remaining volume.

A source clock regeneration method relating to the next invention is characterized in that, in the above invention, the change setting of the manipulated volume at the second step is further adding a predetermined correction value to the buffer remaining volume of the latest side out of the plurality of buffer remaining volumes used for the calculation of the weighted average value. According to this invention, the change setting of the manipulated volume at the second step is further adding a predetermined correction value to the buffer remaining volume of the latest side out of the plurality of buffer remaining volumes used for the calculation of the weighted average value.

A source clock regeneration method relating to the next invention is characterized in that, in the above invention, the correction value is a time threshold value that changes along with a lapse of time toward a final value after the final value has been decided. According to this invention, the correction value is a time threshold value that changes along with a lapse of time toward a final value after the final value has been decided.

A source clock regeneration method relating to the next invention is characterized in that, in the above invention, the manipulation volume sets a multiplication value of the sensitivity coefficient, an average modulus for prescribing the weighted average calculation of the plurality of buffer remaining volumes, and the predetermined interval, to a constant value corresponding to an optimum value. According to this invention, the manipulation volume sets a multiplication value of the sensitivity coefficient, an average modulus for prescribing the weighted average calculation of the plurality of buffer remaining volumes, and the predetermined interval, to a constant value corresponding to an optimum value.

A source clock regeneration method relating to the next invention is characterized in that, in the above invention, the second step is the process of carrying out two or more processing in combination from out of the processing of setting the sensitivity coefficient to a small value and at the same time further adding a predetermined correction value to the offset value, the processing of setting small the weight of the buffer remaining volume at the latest side out of the plurality of buffer remaining volumes used for the calculation of the weighted average value, the processing of changing a predetermined interval for detecting the buffer remaining volume, and the processing of further adding a predetermined correction value to the buffer remaining volume of the latest side out of the plurality of buffer remaining volumes used for the calculation of the weighted average value.

According to this invention, the second step is the process of carrying out two or more processing in combination a from out of the processing of setting the sensitivity coefficient to a small value and at the same time further adding a predetermined correction value to the offset value, the processing of setting small the weight of the buffer remaining volume at the latest side out of the plurality of buffer remaining volumes used for the calculation of the weighted average value, the processing of changing a predetermined interval for detecting the buffer remaining volume, and the processing of further adding a predetermined correction value to the buffer remaining volume of the latest side out of the plurality of buffer remaining volumes used for the calculation of the weighted average value.

A source clock regeneration method relating to the next invention is characterized in that, in the above invention, the second step further adds a predetermined correction value to the buffer remaining volume of the latest side out of the plurality of buffer remaining volumes used for the calculation of the weighted average value, and further includes a third step of carrying out one or more processing in combination from out of the processing of setting the sensitivity coefficient to a small value and at the same time further adding a predetermined correction value to the offset value, the processing of setting small the weight of the buffer remaining volume at the latest side out of the plurality of buffer remaining volumes used for the calculation of the weighted average value, and the processing of changing a predetermined interval for detecting the buffer remaining volume, after the predetermined condition has been satisfied again.

According to this invention, the second step further adds a predetermined correction value to the buffer remaining volume of the latest side out of the plurality of buffer remaining volumes used for the calculation of the weighted average value, and the source clock regeneration method further comprises a third step of carrying out one or more processing in combination from out of the processing of setting the sensitivity coefficient to a small value and at the same time further adding a predetermined correction value to the offset value, the processing of setting small the weight of the buffer remaining volume at the latest side out of the plurality of buffer remaining volumes used for the calculation of the weighted average value, and the processing of changing a predetermined interval for detecting the buffer remaining volume, after the predetermined condition has been satisfied again.

A source clock regeneration method relating to the next invention is characterized in that, in the above invention, the source clock regeneration method further comprises a fourth step of returning a regeneration clock to an initial set state of before starting the source clock regeneration operation when the frequency variation range of the regeneration clock has exceeded a predetermined value after the predetermined condition has been satisfied, and thereafter further sequentially carries out the first step, the second step or the third step. According to this invention, a regeneration clock is returned to an initial set state of before starting the source clock regeneration operation when the frequency variation range of the regeneration clock has exceeded a predetermined value after the predetermined condition has been satisfied, and thereafter further the first step, the second step or the third step is sequentially carried out.

A recording medium relating to the next invention is characterized in that the recording medium is recorded with a program for making a computer execute one of the methods described in the above-described inventions. Based on this arrangement, this program can be read by a machine so that computers can realize the above-described operations of the inventions.

BRIEF DESCRIPTION OF THE DRAWINGS

FIG. 21 is a waveform diagram of a regeneration clock frequency in relation to a lapse time in a case where set values are changed.

BEST MODE FOR CARRYING OUT THE INVENTION

Preferred modes of a data receiving apparatus, a method of regenerating a source clock to be used therefor, and a computer-readable recording medium having recorded thereon a program for making a computer execute this method will be explained below with reference to the attached drawings.

Figure 1:
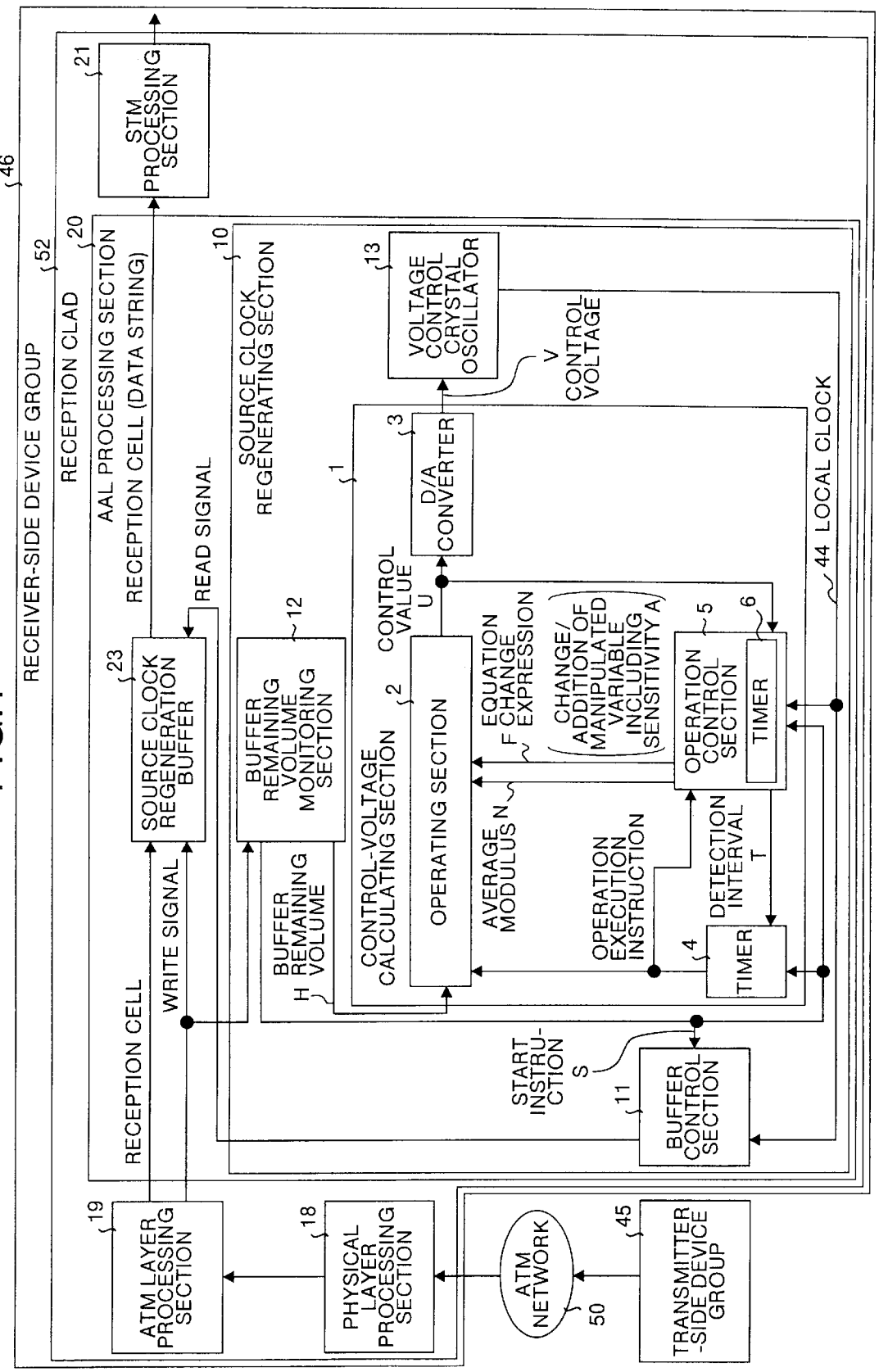
FIG. 1 is a functional configuration block diagram of an ATM communication system including a data receiving apparatus as a first embodiment of this invention.

First, a first embodiment of this invention will be explained. FIG. 1 is a functional configuration block diagram of an ATM communication system including a data receiving apparatus as a first embodiment of this invention. This data receiving apparatus corresponds to the reception CLAD 52. The ATM communication system shown in FIG. 1 has a structure similar to that of the conventional ATM communication system shown in FIG. 16 to FIG. 19. However, the internal structure of the control-voltage calculating section 1 is different from that of the conventional ATM communication system. Structural elements identical with those of the conventional ATM communication system are attached with identical legends.

In this ATM communication system, the operating section 2 of the control-voltage calculating section 1 calculates a control value U based on a buffer remaining volume H that is output from the buffer-remaining volume monitoring section 12. The D/A converter 3 converts the control value U that is a digital value output from the operating section 2 into an analog value. The timer 4 instructs the operating section 2 to execute the operation at each constant cycle. The operation control section 5 posts an average modulus N to the operating section 2, instructs to change the equation including a sensitivity A, and further posts a detection interval T of a buffer remaining volume T to the timer 4.

Sound data transmitted from the transmission CLAD 51 within a transmitter-side device group 45, that is, an ATM cell, is received by the reception CLAD 52 within a receiver-side device group 46 via the ATM network 50. Thereafter, the received ATM cell within the reception CLAD 52 is input to the AAL processing section 20 via the physical layer processing section 18 and the ATM layer processing section 19, and is then subjected to an AAL type 1 processing such as a cell abandon/erroneous insertion check processing, a fluctuation absorption processing, a conversion from an ATM cell to a data string, and a source clock frequency regeneration processing, according to a sequence number within a header of the AAL type 1. The sound data that has been converted into a data string by the AAL processing section 20 is then transmitted to the STM processing section 21.

Next, operation in case of regeneration of the source clock frequency will be explained. First, in the AAL processing section 20, reception cells 60a to 60c that have been input from the ATM layer processing section 19 are written into the source clock regeneration buffer 23 based on a write signal. In this case, sound data of an effective speed 1.544 Mb/s is transferred between blocks at a data transfer speed of 155.52 Mb/s. Therefore, the transfer state of the reception cells 60a to 60c at this time becomes in a burst shape in a cell unit as shown in FIG. 3(a).

The buffer-remaining volume monitoring section 12 monitors a write signal from the ATM layer processing section 19, and monitors that the sound data is buffered to the read starting threshold value TH that is set to the center value (½) of the total capacity of the source clock regeneration buffer 23. When the buffer-remaining volume monitoring section 12 has detected that the sound data has been,buffered to the read starting threshold value TH, the buffer-remaining volume monitoring section 12 gives a start instruction S to the buffer control section 11 to start the reading from the source clock regeneration buffer 23, and at the same time instructs the control-voltage calculating section 1 to start the operation. Thereafter, the operating section 2 within the control-voltage calculating section 1 calculates the control value U based on the buffer remaining volume H sent from the buffer-remaining volume monitoring section 12, according to the operation execution instruction sent from the timer 4 at a constant cycle. The buffer-remaining volume monitoring section 12 thereafter continuously obtains the buffer remaining volume H from the operation of the write signal and the read signal, and posts this buffer remaining volume H to the control-voltage calculating section 1.

Figure 3:
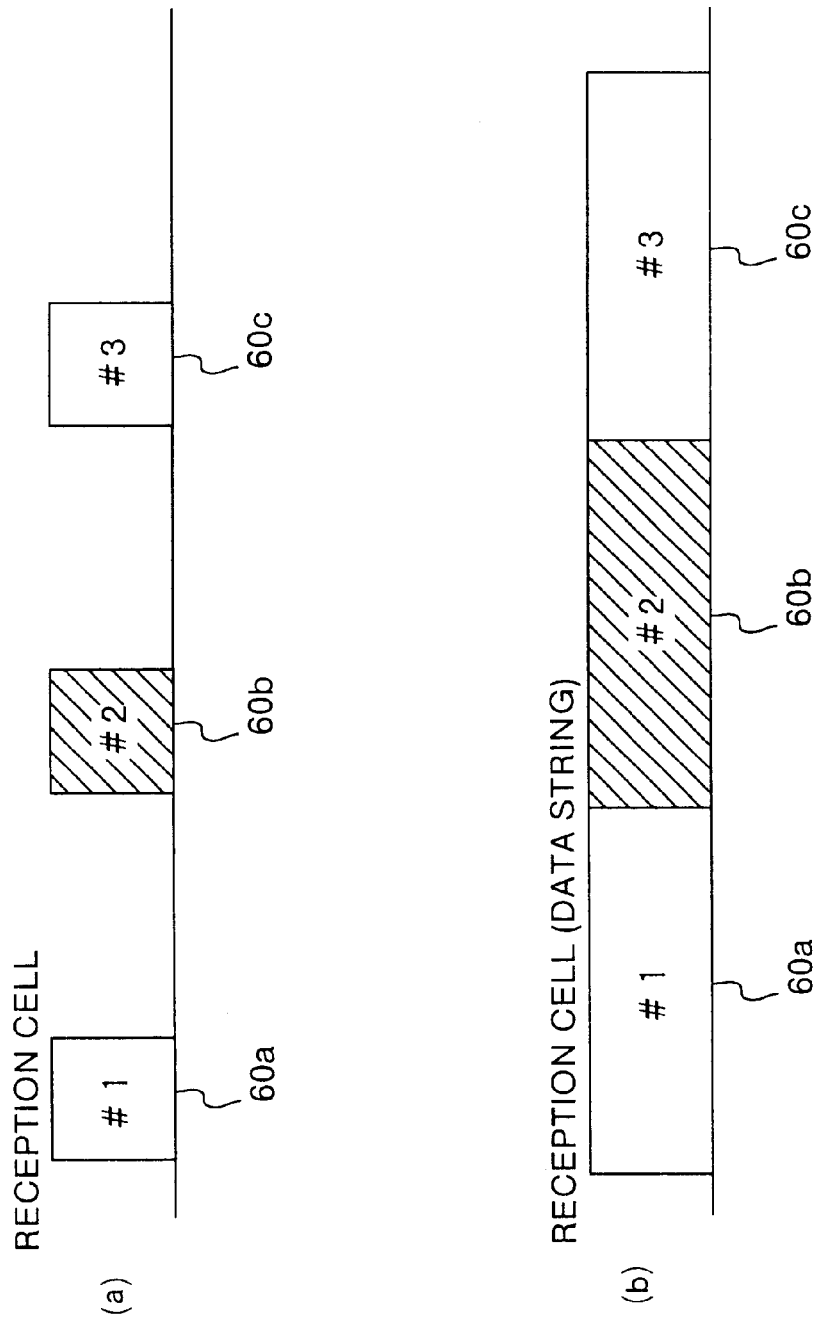
FIG. 3 is an explanatory diagram showing a transfer state of reception cells that are input to an AAL processing section and a transfer state of reception cells that are output from the AAL processing section.

As the reading from the source clock regeneration buffer 23 is carried out at the effective speed of the sound data 1.544 Mb/s, the transfer state of the reception cells 60a to 60c becomes in a continuous data string as shown in FIG. 3(b). The difference in the lengths of the reception cells 60a to 60c between those shown in FIG. 3(a) and those shown in FIG. 3(b) is due to the difference in data transfer speeds between the two cases. The data sizes for these are all the same.

When the buffer remaining volume H is in the increasing trend, the control-voltage calculating section 1 regards the frequency of the local clock 44 to be lower than the source clock 43, and controls the voltage control crystal oscillator 13 to increase the frequency of the local clock 44. On the other hand, when the buffer remaining volume H is in the decreasing trend, the control-voltage calculating section 1 controls to lower the frequency of the local clock 44. The voltage control crystal oscillator 13 changes the oscillation frequency of the local clock 44 according to the control voltage V from the control-voltage calculating section 1. The buffer control section 11 outputs a read signal to the source clock regeneration buffer 23 based on the local clock 44 output from the voltage control crystal oscillator 13.

As shown in FIG. 1, within the control-voltage calculating section 1, the operating section 2 calculates the control value U from the buffer remaining volume H according to the operation execution instruction from the timer 4, and posts this control value U to the D/A converter 3. An equation for obtaining the control value U in the operation section 2 is as follows.

$$\text{Control value } U=\text{sensitivity } A\times(\text{weighted average value } M \text{ of (buffer remaining volume } H-\text{center value } C))+\text{offset value } B \quad (1)$$

In this case, sensitivity A is a coefficient for converting the weighted average value M into the control value U. When this value is larger, the oscillation frequency of the local clock 44 comes to react sensitively to changes in the weighted average value M, and the convergence time also becomes shorter. The offset value B is a value for outputting the reference frequency to the voltage control crystal oscillator 13. For example, when the frequency variable range is 1.544 MHz±100 ppm, this is a value for outputting 1.544 MHz+0 ppm that is the center frequency thereof. Further, the center value C means the center value (½) of the total capacity of the source clock regeneration buffer 23, and this is the same value as the read starting threshold value TH.

The buffer remaining volume H is not limited to a buffer remaining volume displayed in a detailed number of bytes or number of bits, but may also be a value displayed in any optional unit such as 48 bytes and 64 bytes. For example, 64 bytes may be used as a minimum unit.

In the system that employs equation (1) for calculating the control value U, there is a trend that basically when the transfer speed of the sound data is slower, the convergence time of the local clock 44 becomes longer. However, when the sensitivity A is simply made larger in order to shorten the convergence time, the frequency stability after the convergence is aggravated. To avoid this problem, the initial value of the sensitivity A, that is, the sensitivity A immediately after starting the clock regeneration operation, is set to a large value, and this value is changed to a small value after a constant time P has passed. In other words, the shortening of the convergence time and the frequency stability after the convergence are improved by changing the sensitivity A from a large value to a small value. The constant time P in this case means a time during which the local clock 44 sufficiently converges at the initial value (large value) of the sensitivity A.

However, when the sensitivity A in equation (1) is suddenly changed to a smaller value, the control value U also becomes a small value at this moment. As a result, the frequency of the local clock 44 also becomes small rapidly. Despite the fact that the frequency of the local clock 44 has come closer to the frequency of the source clock 43 based on the preceding operation, this frequency leaves from the frequency of the source clock 43 again.

Therefore, in the first embodiment, the sensitivity A is changed to a small value and following equation (3) is used to calculate control value U. In other words, a value lost by changing the sensitivity A to a small value is compensated for by adding a correction value D to the offset value B.

$$\text{Control value } U=\text{sensitivity } A\times(\text{weighted average value } M \text{ of (buffer remaining volume } H-\text{center value } C))+\text{offset value } B+\text{correction value } D \quad (3)$$

In this case, when the initial value (large value) of the sensitivity A is A0, the small value after the change is A1, and the weighted average value M at the time of changing the sensitivity A is M0, then the correction value D, for example, is obtained through equation (4).

$$\text{Correction value } D=(A0-A1)\times M0 \quad (4)$$

The relationship represented by equation (2) exists among the sensitivity A, the average modulus N, and the detection interval T of the buffer remaining volume that make the convergence curve of the local clock 44 have an ideal shape as shown by the convergence curve 70b. Therefore, in order that the convergence curve after the change of the sensitivity A has an ideal shape, that is, in order to maintain an optimum solution, it is necessary that one of or both of the average modulus N and the detection interval T are changed simultaneously with the changing of the sensitivity A to satisfy equation (2). There are various combinations of changing, like, for example, when the sensitivity A is changed to ¼ of the initial value, the average modulus N is multiplied by four or the detection interval T is multiplied by four, or the average modulus N and the detection interval T are both multiplied by two, or the average modulus N is multiplied by eight and the detection interval T is multiplied by ½, at the same time when the sensitivity A is changed, respectively.

Regarding the values of the average modulus N and the detection interval T after the changing, values that are optimum for the system applied are selected by taking into account the scale of the operating circuit and the limit of the operation speed.

It is needless to mention that the values of the average modulus N and the detection interval T may be changed to values that do not give an optimum solution, or these values may not be changed at all, when a system design engineer has decided that it is not necessary to maintain the convergence curve in the ideal shape after a lapse of the constant time P.

The operation control section 5 controls the changing of the equation change instruction F including the sensitivity A, the average modulus N, and the detection interval T of the buffer remaining volume H at the same time. The initial values and the changed values of these are stored in the operation control section 5, and are posted from the operation control section 5, the operating section 2 and the timer 4 at a necessary timing. The operation control section 5 may instruct the changing of the sensitivity A independent of the equation change instruction F. The operation control section 5 also detects the start timing of the clock regeneration operation and a lapse of the constant time P. The operation control section 5 monitors the start instruction S from the buffer-remaining volume monitoring section 12 and the operation execution instruction from the timer 4, thereby to detect these timings, and at the same time, measures the constant time P after the starting by the timer 6. The length of the constant time P is measured by the timer 6 within the operation control section 5, and this time length is stored inside.

The operating section 2 that has received the equation change instruction F from the operation control section 5 latches the weighted average value M at this time as M0, calculates the correction value D, and changes the equation for calculating the control value U from equation (1) to equation (3).

Figure 2:
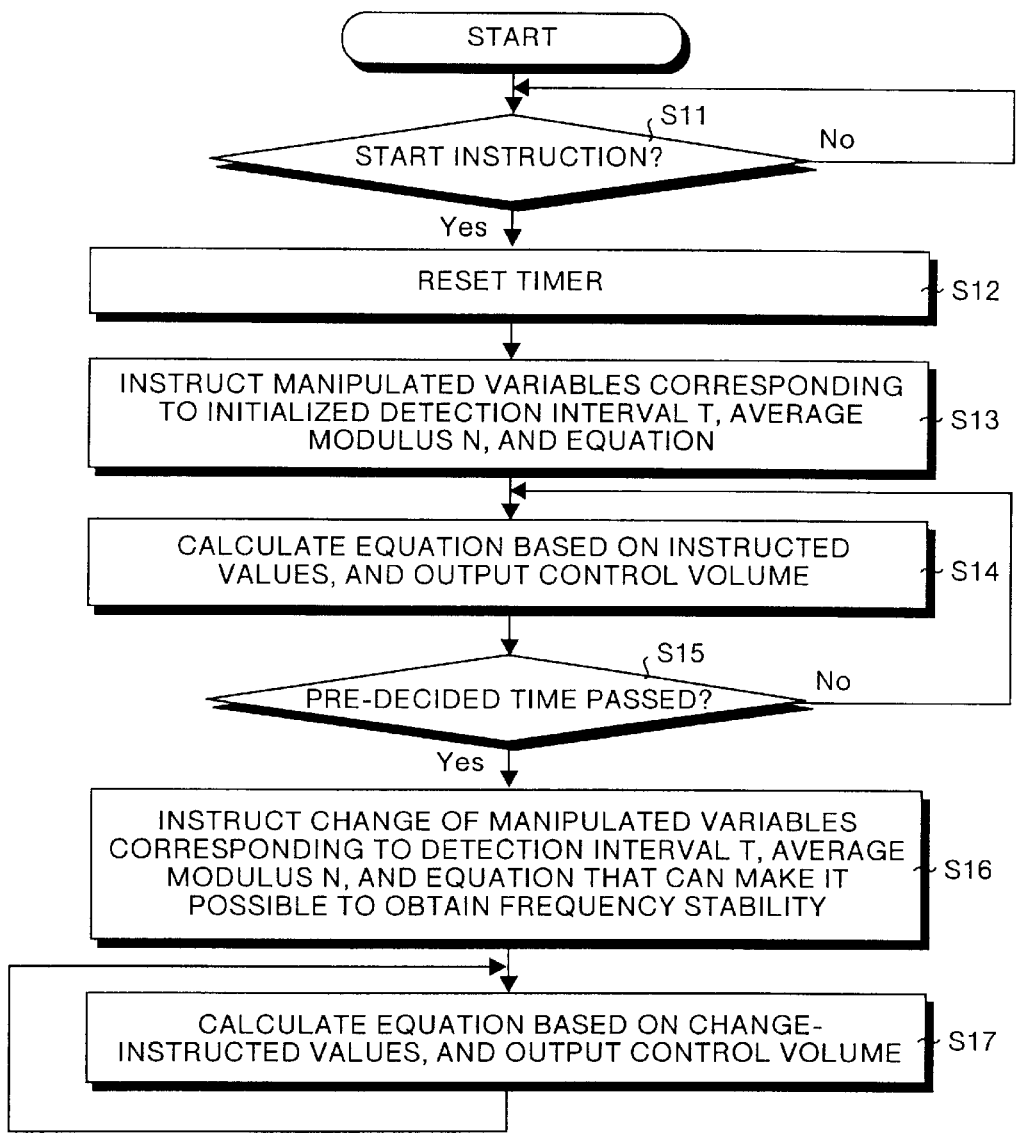
FIG. 2 is a flowchart showing a series of control processing procedures of a control-voltage calculating section in the first embodiment of this invention.

A series of control processing procedures of the control-voltage calculating section 1 will be explained below with reference to a flowchart shown in FIG. 2. First, the operation control section 5 makes a decision as to whether the start instructions from the buffer-remaining volume monitoring section 12 has been received or not (step S11). When the start instruction S has been received (step S11, YES), the operation control section 5 resets the timer 6 (step S12), and starts the measuring of the constant time P. Thereafter, the operation control section 5 instructs the initialized detection interval T to the timer 4, and instructs the average modulus N and the equation (1) including the sensitivity A to the operating section 2 (step S13). Thereafter, the operating section 2 solves equation (1) based on the instructed values, at the time of instructing the execution of the operation at every detection interval T input from the timer 4, and outputs the control volume U to the D/A converter 3 (step S14).

Thereafter, the operation control section 5 makes a decision as to whether the time measured by the timer 6 has passed the constant time P or not (step S15). When the constant time P has passed (step S15, YES), in order to obtain the frequency stability, the operation control section 5 sends to the operating section 2 the equation change instruction F including the sensitivity A, that is, the instruction for making small the sensitivity A and the instruction for changing the equation from equation (1) to equation (3), and at the same time, instructs the changing of the detection interval T and the average modulus N, to the timer 4 and the operating section 2 respectively (step S16). When the constant time P has not passed (step S15, NO), the process proceeds to step S14 and the output processing of the control volume U is repeated. Thereafter, the operating section 2 calculates solves equation (3) based on the change-instructed values, and outputs the control volume U that is a result of the calculation, to the D/A converter 3 (step S17), and repeats this processing.

The control value U as a digital value obtained in the above-described manner is converted into a control voltage V as an analog value by the D/A converter 3, and a result is used for increasing or decreasing the frequency of the local clock 44 that is an output of the voltage control crystal oscillator 13. The local clock 44 that has been frequency-synchronized with the source clock 43 by the source clock frequency regeneration operation of the above-described source clock regenerating section 10 is output from the voltage control crystal oscillator 13. Based on this local clock 44, the buffer control section 11 outputs a read signal to the source clock regeneration buffer 23, thereby to read the ATM cell from the source clock regeneration buffer 23.

According to the above-described first embodiment, the sensitivity A is set so that the convergence time becomes short immediately after the starting of the clock regeneration operation, and thereafter, after a lapse of the constant time P, the sensitivity A, the average modulus N and the detection interval T of the buffer remaining volume are changed in order to improve the frequency stability. At the same time, the correction value D is added to the offset value B. Therefore, a system design engineer can select with some degree of freedom the convergence time of the local clock 44 and the frequency stability after the convergence. As a result, there is an effect that it is possible to obtain a value that is optimum for the ATM communication system applied.

Figure 4:
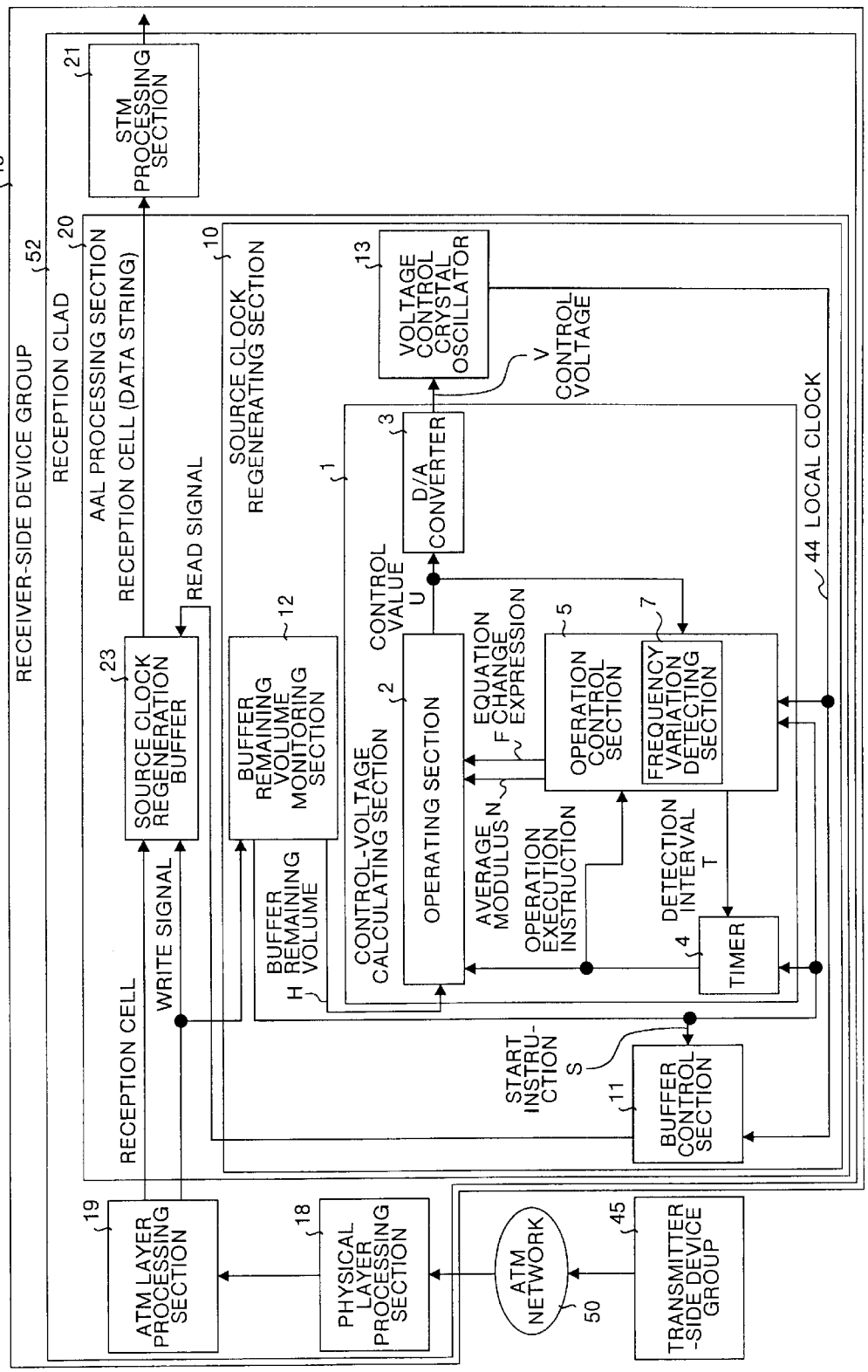
FIG. 4 is a functional configuration block diagram of an ATM communication system including a data receiving apparatus as a second embodiment of this invention.

Next, a second embodiment of this invention will be explained. FIG. 4 is a functional configuration block diagram of an ATM communication system including a data receiving apparatus as a second embodiment of this invention. In this case, the data receiving apparatus corresponds to the reception CLAD 52. The ATM communication system shown in FIG. 4 has a structure similar to that of the conventional ATM communication system shown in FIG. 16 to FIG. 19, but the internal structure of a control-voltage calculating section 1 is different from that of the conventional ATM communication system. Structural elements identical with those of the conventional ATM communication system are attached with identical symbols.

In the first embodiment, the operation control section 5 has the timer 6 inside thereof, and changes the equation including the sensitivity A, the average modulus N, and the detection interval T of the buffer remaining volume H, after a lapse of the constant time P. In the second embodiment, a frequency variation detecting section 7 is provided inside the operation control section 5. This frequency variation detecting section 7 detects a frequency variable range of the local clock 44, and when the frequency variable range has become equal to or lower than a predetermined threshold value G, the frequency variation detecting section 7 changes the equation including the sensitivity A, the average modulus N, and the detection interval T of the buffer remaining volume H. In other words, while the first embodiment attaches importance to the convergence time, the second embodiment attaches importance to the frequency stability.

As shown in FIG. 4, the structure of the second embodiment is different from that of the first embodiment shown in FIG. 1 in only the structure of the operation control section 5, and other structures and operations are the same as those of the first embodiment.

The operation control section 5 always monitors the control value U output from the operating section 2, and at the same time, detects the frequency variable range of the local clock 44. This frequency variable range may be defined as a difference between a maximum value and a minimum value of the frequency of the local clock 44 within the observation time that is repeated at a constant interval, such as, for example, the intervals of the generation of the operation execution instruction from the timer 4. Alternatively, the frequency variable range may be defined as a simple difference between the frequency at the time of starting the observation time and the frequency at the time of finishing this observation or at the next starting time. A system design engineer suitably determines the definition of this frequency variable range to match the system applied. A threshold value G of the frequency variable range of the source clock 14 is held by the operation control section 5.

Figure 5:
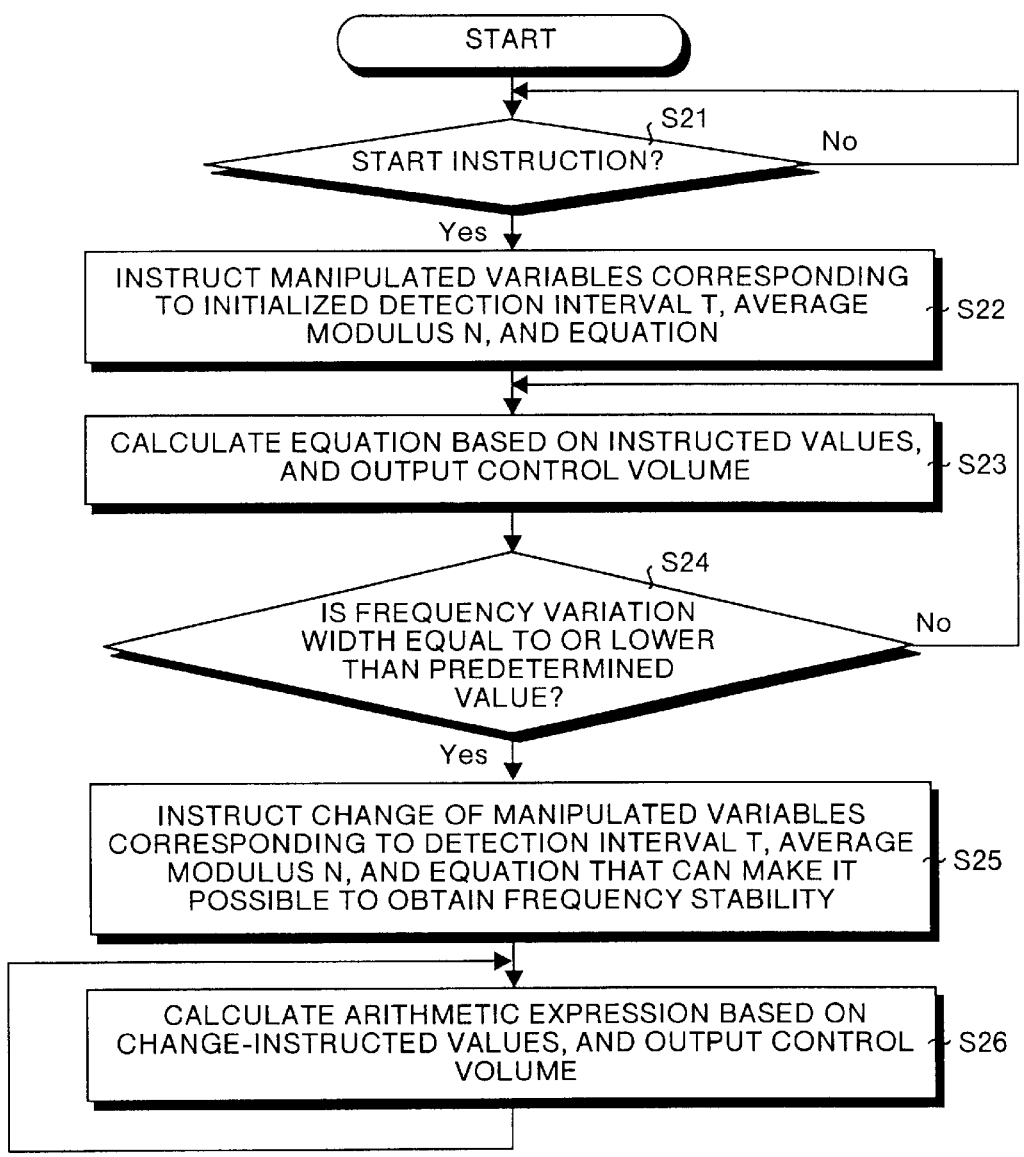
FIG. 5 is a flowchart showing a series of control processing procedures of a control-voltage calculating section in the second embodiment of this invention.

A series of control processing procedures of the control-voltage calculating section 1 will be explained below with reference to a flowchart shown in FIG. 5. First, the operation control section 5 makes a decision as to whether the start instruction S from the buffer-remaining volume monitoring section 12 has been received or not (step S21). When the start instruction S has been received (step S21, YES), the operation control section 5 instructs the initialized detection interval T to the timer 4, and at the same time, instructs the average modulus N and equation (1) including the sensitivity A to the operating section 2 (step S22). Thereafter, the operating section 2 solves equation (1) based on the instructed values, at the time of instructing the execution of the operation at every detection interval T input from the timer 4, and outputs the control volume U to the D/A converter 3 (step S23).

Thereafter, the operation control section 5 makes a decision as to whether or not the frequency variable range detected by the frequency variation detecting section 7 is equal to or lower than the predetermined threshold value G (step S24). When the frequency variable range is not equal to or lower than the predetermined threshold value G (step S24, NO), the process proceeds to step S23, and the output processing of the control volume U is repeated. On the other hand, when the frequency variable range is equal to or lower than the predetermined threshold value G (step S24, YES), in order to obtain the frequency stability, the operation control section 5 sends to the operating section 2 the equation change instruction F including the sensitivity A, that is, the instruction for making small the sensitivity A and the instruction for changing the equation from equation (1) to equation (3), and at the same time, instructs the changing of the detection interval T and the average modulus N, to the timer 4 and the operating section 2 respectively (step S25). Thereafter, the operating section 2 solves equation (3) based on the change-instructed values, and outputs the control volume U that is a result of the calculation, to the D/A converter 3 (step S26), and repeats this processing.

The control value U as a digital value obtained in the above-described manner is converted into a control voltage V as an analog value by the D/A converter 3, and a result is used for increasing or decreasing the frequency of the local clock 44 that is an output of the voltage control crystal oscillator 13.

The local clock 44 that has been frequency-synchronized with the source clock 43 by the source clock frequency regeneration operation of the above-described source clock regenerating section 10 is output from the voltage control crystal oscillator 13. Based on this local clock 44, the buffer control section 11 outputs a read signal to the source clock regeneration buffer 23, thereby to read the ATM cell from the source clock regeneration buffer 23.

According to the above-described second embodiment, the sensitivity A is set so that the convergence time becomes short immediately after the starting of the clock regeneration operation, and thereafter, when the frequency variable range of the local clock 44 has become equal to or smaller than the threshold value G, the sensitivity A, the average modulus N and the detection interval T of the buffer remaining volume are changed in order to improve the frequency stability. At the same time, the correction value D is added to the offset value B. Therefore, a system design engineer can select with some degree of freedom the convergence time of the local clock 44 and the frequency stability after the convergence. As a result, there is an effect that it is possible to obtain a value that is optimum for the ATM communication system applied.

Figure 6:
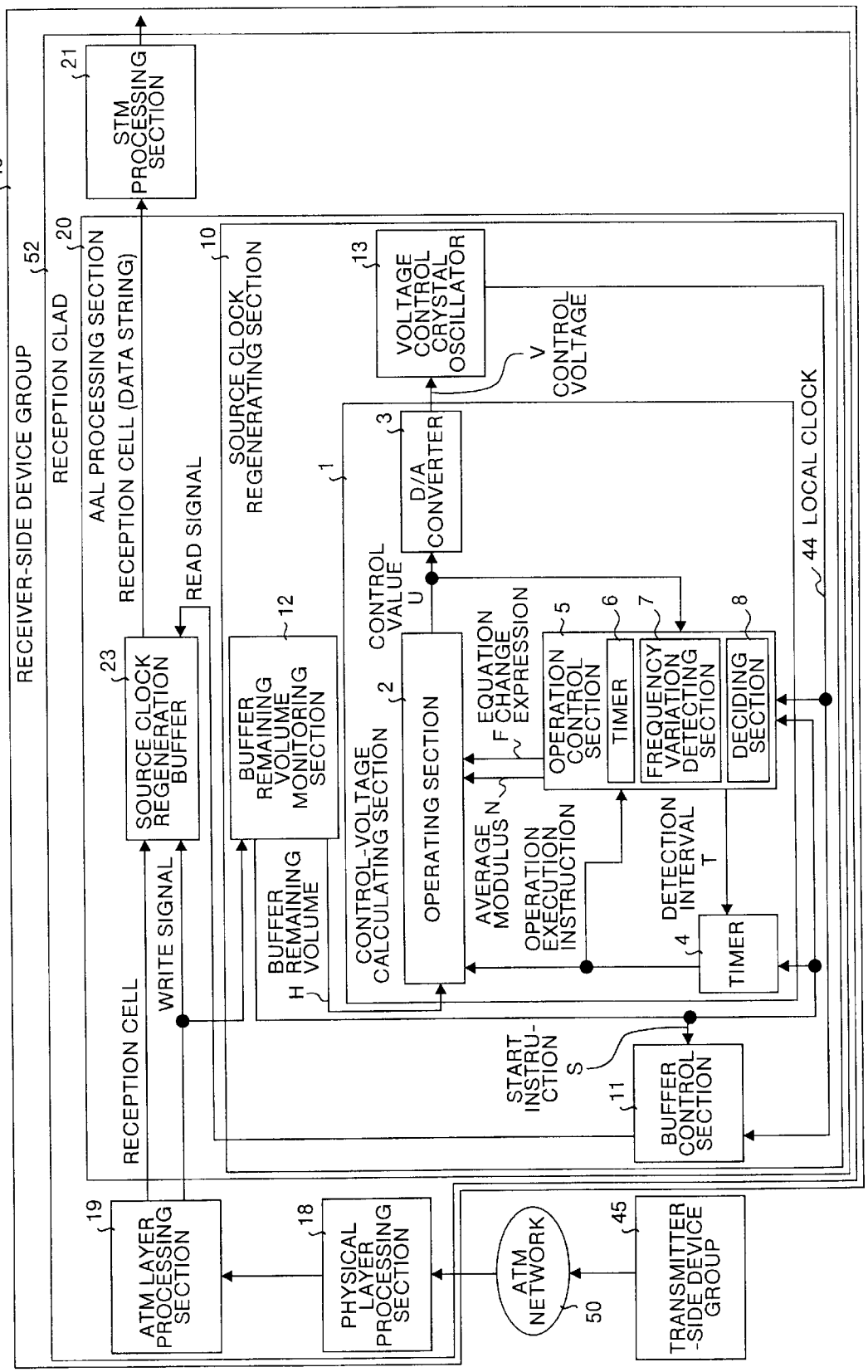
FIG. 6 is a functional configuration block diagram of an ATM communication system including a data receiving apparatus as a third embodiment of this invention.

Next, a third embodiment of this invention will be explained. FIG. 6 is a functional configuration block diagram of an ATM communication system including a data receiving apparatus as a third embodiment of this invention. In this case, the data receiving apparatus corresponds to the reception CLAD 52. The ATM communication system shown in FIG. 6 has a structure similar to that of the conventional ATM communication system shown in FIG. 16 to FIG. 19, but the internal structure of a control-voltage calculating section 1 is different from that of the conventional ATM communication system. Structural elements identical with those of the conventional ATM communication system are attached with identical symbols.

In the first embodiment, the operation control section 5 has the timer 6 inside thereof, and changes the equation including the sensitivity A, the average modulus N, and the detection interval T of the buffer remaining volume H, after a lapse of the constant time P. Further, in the second embodiment, the frequency variation detecting section 7 is provided inside the operation control section 5. This frequency variation detecting section 7 detects a frequency variable range of the local clock 44, and when the frequency variable range has become equal to or lower than a predetermined threshold value G, the frequency variation detecting section 7 changes the equation including the sensitivity A, the average modulus N, and the detection interval T of the buffer remaining volume H. In the third embodiment, the timer 6, the frequency variation detecting section 7 and the deciding section 8 are provided within the operation control section 5. When either a condition that the constant time P measured by the timer 6 has passed or a condition that a frequency variable range detected by the frequency variation detecting section 7 is equal to or lower than the predetermined threshold value G has been satisfied, the operation control section 5 changes the equation including the sensitivity A, the average modulus N, and the detection interval T of the buffer remaining volume H.

As shown in FIG. 6, the structure of the third embodiment is different from that of the first embodiment shown in FIG. 1 or that of the second embodiment shown in FIG. 4 in only the structure of the operation control section 5, and other structures and operations are the same as those of the first embodiment or the second embodiment.

When either that the constant time P measured by the timer 6 has passed or that a frequency variable range of the local clock 44 detected by the frequency variation detecting section 5 has become equal to or lower than the predetermined threshold value G has been satisfied, the operation control section 5 instructs to change the equation including the sensitivity A from equation (1) to equation (3), and at the same time, instructs to change the average modulus N and the detection interval T. Like the second embodiment, this frequency variable range may be defined as a difference between a maximum value and a minimum value of the frequency of the local clock 44 within the observation time that is repeated at a constant interval, such as, for example, the intervals of the generation of the operation execution instruction from the timer 4. Alternatively, the frequency variable range may be defined as a simple difference between the frequency at the time of starting the observation time and the frequency at the time of finishing this observation or at the next starting time. A system design engineer suitably determines the definition of this frequency variable range to match the system applied. The threshold value G of the frequency variable range of the source clock 14 and the constant time T are held by the operation control section 5.

Figure 7:
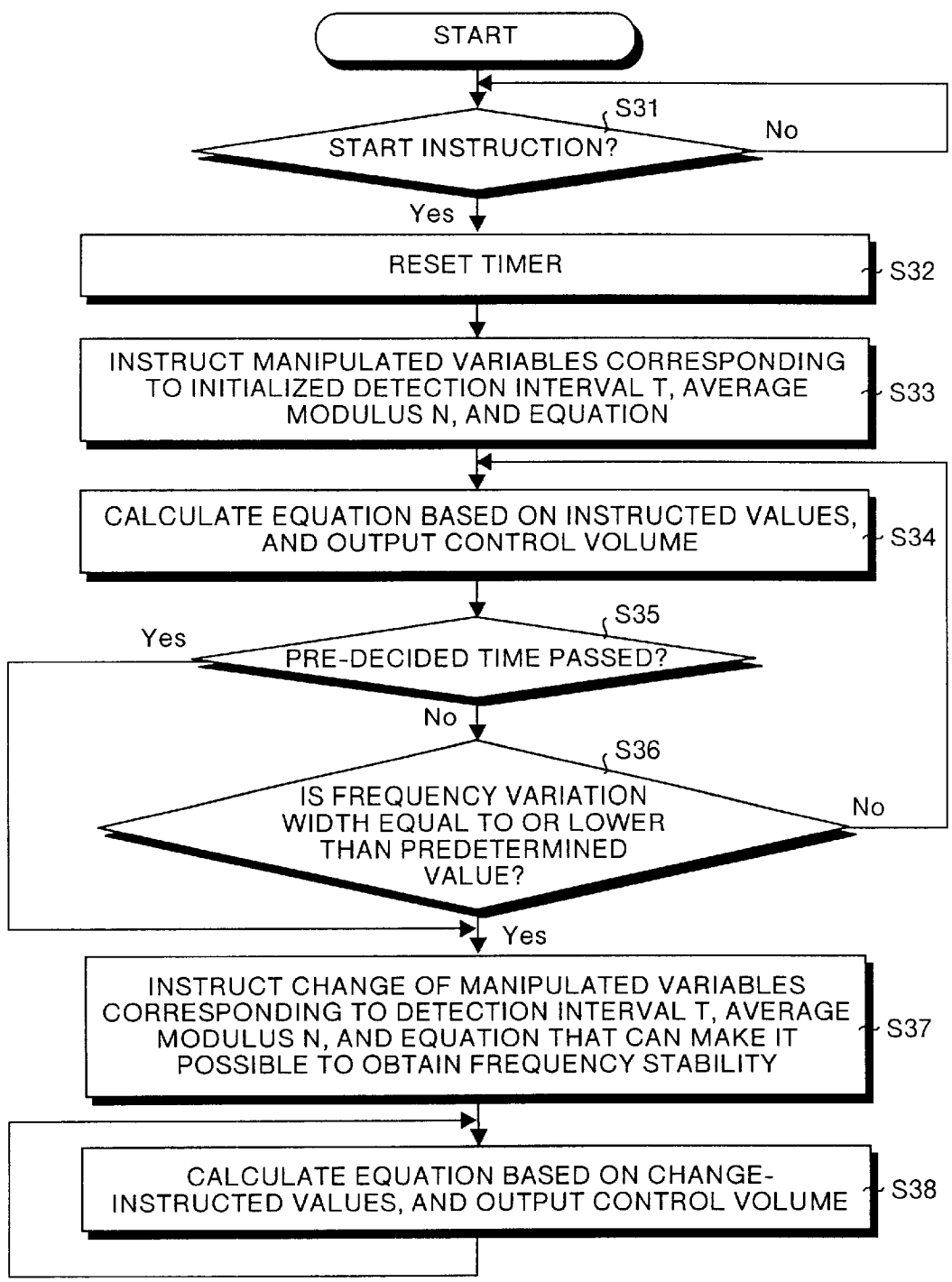
FIG. 7 is a flowchart showing a series of control processing procedures of a control-voltage calculating section in the third embodiment of this invention.

A series of control processing procedures of the control-voltage calculating section 1 will be explained below with reference to a flowchart shown in FIG. 7. First, the operation control section 5 makes a decision as to whether the start instruction S from the buffer-remaining volume monitoring section 12 has been received or not (step S31). When the start instruction S has been received (step S31, YES), the operation control section 5 resets the timer 6 (step S32), and starts the measuring of the constant time P. Thereafter, the operation control section 5 instructs the initialized detection interval T to the timer 4, and at the same time, instructs the average modulus N and equation (1) including the sensitivity A to the operating section 2 (step S33).

Thereafter, the operating section 2 solves equation (1) based on the instructed values, at the time of instructing the execution of the operation at every detection interval T input from the timer 4, and outputs the control volume U to the D/A converter 3 (step S34). Thereafter, the deciding section 8 of the operation control section 5 makes a decision as to whether the time measured by the timer 6 has passed the constant time P or not (step S35). When the constant time P has passed (step S35, YES), the process proceeds to step S37.

When the constant time P has not passed (step S35, NO), the deciding section 8 further makes a decision as to whether or not the frequency variable range detected by the frequency variation detecting section 7 is equal to or lower than the predetermined threshold value G (step S36). When the frequency variable range is not equal to or lower than the predetermined threshold value G (step S36, NO), the process proceeds to step S34, and the output processing of the control volume U is repeated. On the other hand, when the frequency variable range is equal to or lower than the predetermined threshold value G (step S36, YES), the process proceeds to step S37. In order to obtain the frequency stability, the operation control section 5 sends to the operating section 2 the equation change instruction F including the sensitivity A, that is, the instruction for making small the sensitivity A and the instruction for changing the equation from equation (1) to equation (3), and at the same time, instructs the changing of the detection interval T and the average modulus N, to the timer 4 and the operating section 2 respectively (step S37). Thereafter, the operating section 2 solves equation (3) based on the change-instructed values, and outputs the control volume U that is a result of the calculation, to the D/A converter 3 (step S38), and repeats this processing.

The control value U as a digital value obtained in the above-described manner is converted into a control voltage V as an analog value by the D/A converter 3, and a result is used for increasing or decreasing the frequency of the local clock 44 that is an output of the voltage control crystal oscillator 13.

The local clock 44 that has been frequency-synchronized with the source clock 43 by the source clock frequency regeneration operation of the above-described source clock regenerating section 10 is output from the voltage control crystal oscillator 13. Based on this local clock 44, the buffer control section 11 outputs a read signal to the source clock regeneration buffer 23, thereby to read the ATM cell from the source clock regeneration buffer 23.

According to the above-described third embodiment, the sensitivity A is set so that the convergence time becomes short immediately after the starting of the clock regeneration operation, and thereafter, when the frequency variable range of the local clock 44 has become equal to or smaller than the threshold value F or when the constant time P has passed, the sensitivity A, the average modulus N and the detection interval T of the buffer remaining volume are changed in order to improve the frequency stability. At the same time, the correction value D is added to the offset value B. Therefore, a system design engineer can select with some degree of freedom the convergence time of the local clock 44 and the frequency stability after the convergence. As a result, there is an effect that it is possible to obtain a value that is optimum for the ATM communication system applied.

Next, a fourth embodiment of this invention will be explained. This fourth embodiment is similar to the structures of the first embodiment to the third embodiment, and is different from the first embodiment to the third embodiment in the structure and the operation of the operation control section 5, like the second embodiment and the third embodiment.

In the first to the third embodiments, the equation including the sensitivity A, the average modulus N, and the detection interval T of the buffer remaining volume H are changed based on a predetermined condition, that is based on a condition that one of the following is satisfied: that the constant time P has passed; that the frequency variable range is equal to or lower than the predetermined threshold value G; and that either the constant time P has passed or the frequency variable range has become equal to or lower than the predetermined threshold value G. In the fourth embodiment, a processing similar to that of the first to the third embodiments is carried out before the predetermined condition, and after the predetermined condition has been satisfied, only equation (1) is changed to the following equation (5) without changing the equation including the sensitivity A, the average modulus N, and the detection interval T of the buffer remaining volume H.

$$\text{Control value } U = \text{sensitivity } A \times (\text{weighted average value } M \text{ of (buffer remaining volume } H-\text{center value } C+\text{correction value } E)) + \text{offset value } B \quad (5)$$

This equation (5) is different from equation (1) in that the correction value E is added to the buffer remaining volume H after the predetermined condition has been satisfied.

This correction value E is a parameter that plays a role of making the buffer remaining volume H after the frequency convergence come closer to the center value C as far as possible. It is considered that the weighted average M at a certain point of time after the convergence, such as for example, a time when the constant time P has passed after the starting of the clock regeneration operation, is employed as the correction value E. As can be seen from equation (5), based on the addition of the correction value E, the buffer remaining volume H comes to fluctuate substantially around the center value C after the frequency has converged as well, regardless of the frequency of the source clock 43.

The operation control section 5 instructs to change the equation from equation (1) to equation (5) when one of the following is satisfied: that the constant time P measured by the timer 6 has passed; that the frequency variable range of the local clock 44 detected by the frequency variation detecting section 5 has become equal to or lower than the predetermined threshold value G; and that either the constant time P has passed or the frequency variable range has become equal to or lower than the predetermined threshold value G. The operation control section 5 does not instruct to change the average modulus N and the detection interval T. Like in the second embodiment and the third embodiment, this frequency variable range may be defined as a difference between a maximum value and a minimum value of the frequency of the local clock 44 within the observation time that is repeated at a constant interval, such as, for example, the intervals of the generation of the operation execution instruction from the timer 4. Alternatively, the frequency variable range may be defined as a simple difference between the frequency at the time of starting the observation time and the frequency at the time of finishing this observation or at the next starting time. A system design engineer suitably determines the definition of this frequency variable range to match the system applied. The threshold value G of the frequency variable range of the source clock 14 and the time constant P are held by the operation control section 5.

The operating section 2 that has received the instruction form the operation control section 5 for changing the equation, latches the weighted average value M at this time as the correction value E, and changes the equation for calculating the control value U from equation (1) to equation (5).

Figure 8:
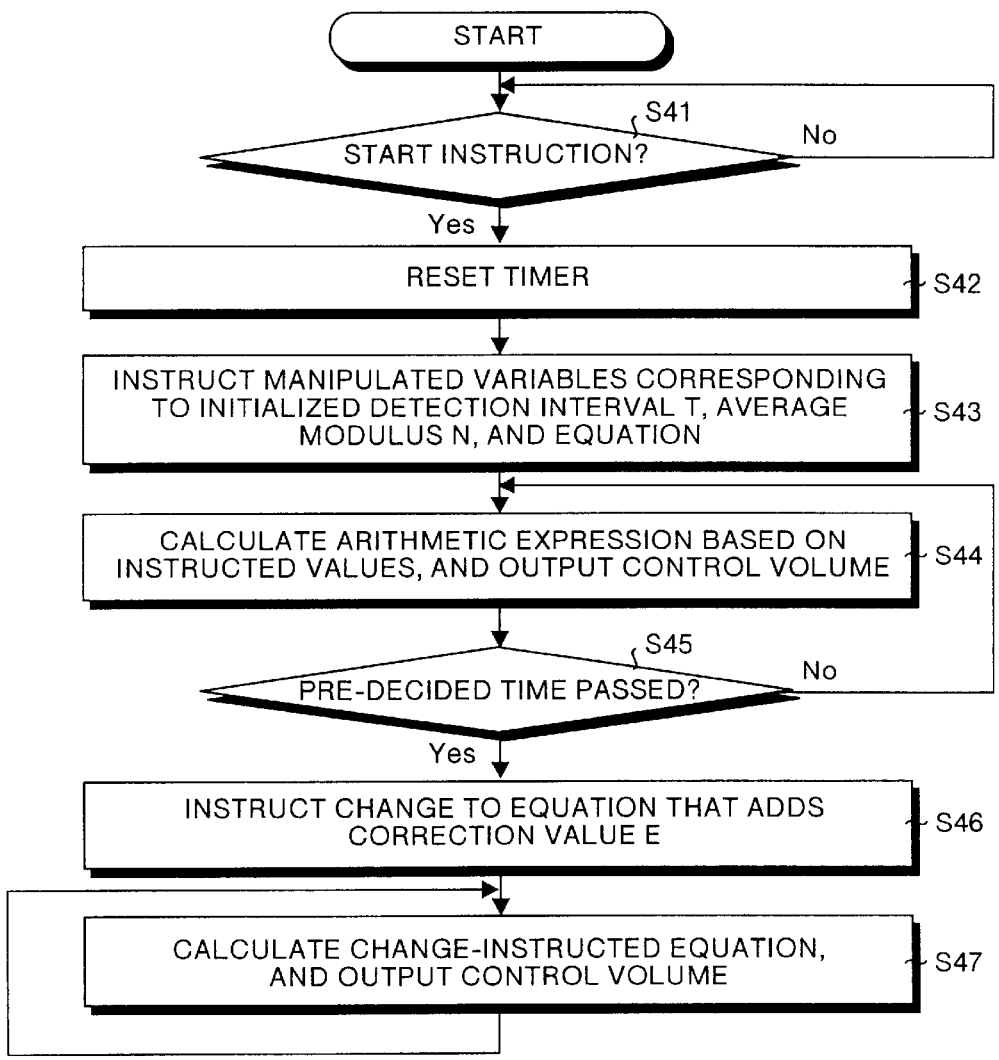
FIG. 8 is a flowchart showing a series of control processing procedures of a control-voltage calculating section in a fourth embodiment of this invention.

A series of control processing procedures of the control-voltage calculating section 1 will be explained below with reference to a flowchart shown in FIG. 8. In this case, the processing is carried out based on a predetermined condition that the constant time P shown in the first embodiment passes. The predetermined conditions shown in the second to the third embodiments may also be employed.

First, the operation control section 5 makes a decision as to whether the start instruction S from the buffer-remaining volume monitoring section 12 has been received or not (step S41). When the start instruction S has been received (step S41, YES), the operation control section 5 resets the timer 6 (step S42), and starts the measuring of the constant time P. Thereafter, the operation control section 5 instructs the initialized detection interval T to the timer 4, and instructs the average modulus N and equation (1) including the sensitivity A to the operating section 2 (step S43).

Thereafter, the operating section 2 solves equation (1) based on the instructed values, at the time of instructing the execution of the operation at every detection interval T input from the timer 4, and outputs the control volume U to the D/A converter 3 (step S44). Thereafter, the operation control section 5 makes a decision as to whether the time measured by the timer 6 has passed the constant time P or not (step S45). When the constant time P has not passed (step S45, NO), the process proceeds to step S44 and the output processing of the control volume U is repeated.

On the other hand, when the constant time P has passed (step S45, YES), the operation control section 5 sends an instruction to the operating section 2 to change from equation (1) to equation (5) that adds the correction value E to the buffer remaining volume H, and does not instruct to change the detection interval T and the average modulus N (step S46). Thereafter, the operating section 2 solves equation (5) based on the change-instructed values, and outputs the control volume U that is a result of the calculation, to the D/A converter 3 (step S47), and repeats this processing.

The control value U as a digital value obtained in the above-described manner is converted into a control voltage V as an analog value by the D/A converter 3, and a result is used for increasing or decreasing the frequency of the local clock 44 that is an output of the voltage control crystal oscillator 13.

The local clock 44 that has been frequency-synchronized with the source clock 43 by the source clock frequency regeneration operation of the above-described source clock regenerating section 10 is output from the voltage control crystal oscillator 13. Based on this local clock 44, the buffer control section 11 outputs a read signal to the source clock regeneration buffer 23, thereby to read the ATM cell from the source clock regeneration buffer 23.

Figure 9:
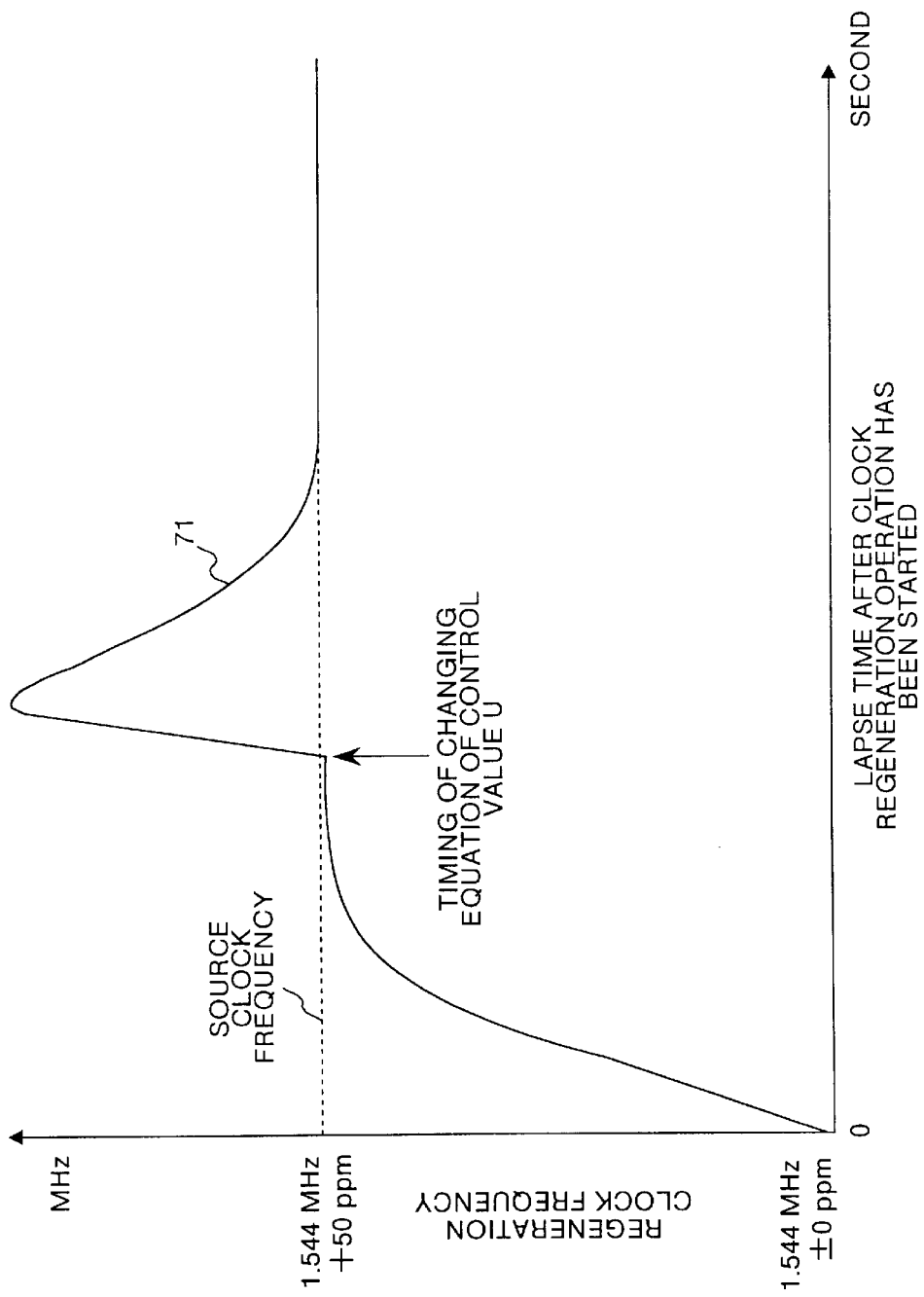
FIG. 9 is a waveform diagram of a reproduction clock frequency of a case where the fourth embodiment of this invention has been applied.

FIG. 9 shows a relationship between the lapse time after the starting of the clock regeneration operation and the changes in the regeneration clock frequency when the fourth embodiment is applied to a case where the source clock frequency is 1.544 Mb/s±50 ppm and the initial value of the regeneration clock frequency is 1.544 Mb/s±0 ppm. As shown in FIG. 9, a convergence curve 71 once shows a rapid increase in the regeneration clock frequency due to the influence of the addition of the correction value E immediately after the equation (1) has been changed to equation (5), and then the regeneration clock frequency finally returns again to the same value as the frequency of the source clock 43.

Although the above-described correction value E has been explained as a constant, this may also be a correction value of a time function that the value increases step by step along with the lapse of time, and becomes constant at a certain point of time (a final value).

Figure 10:
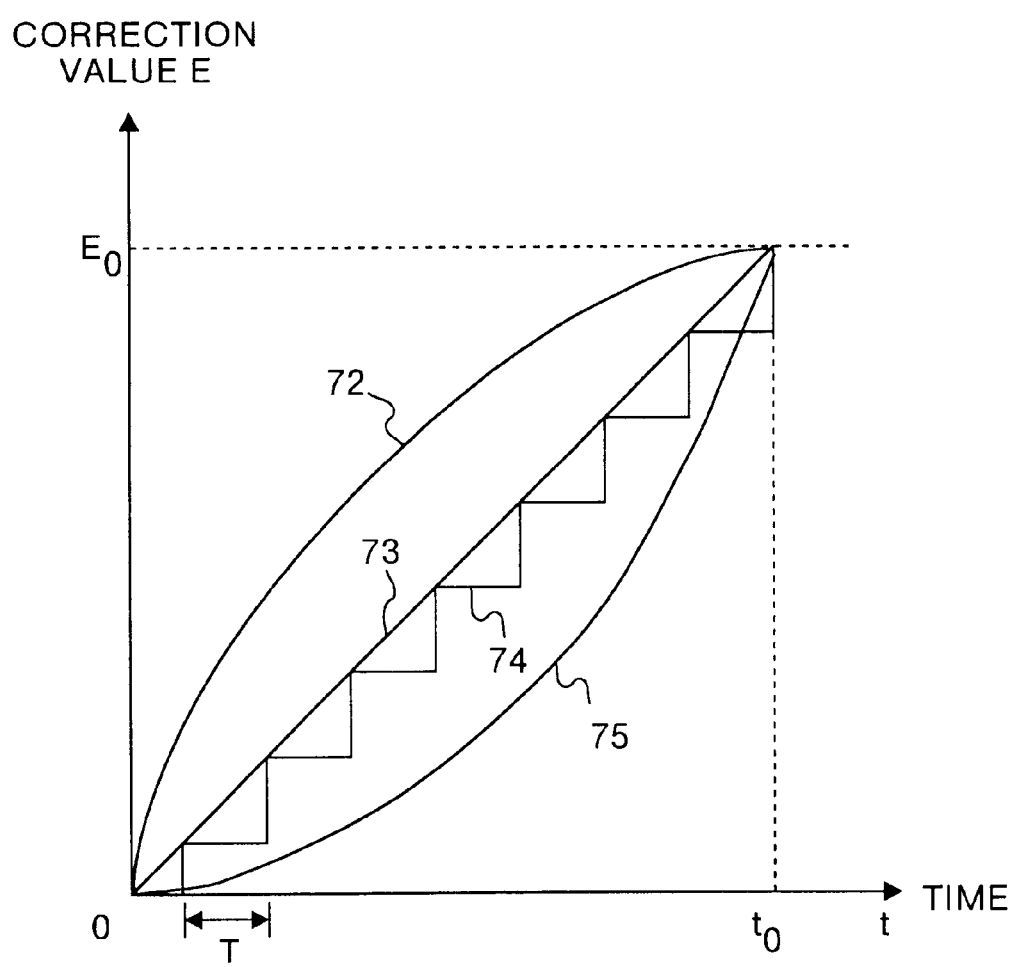
FIG. 10 is a diagram showing a detailed example of a case where a correction value E in the fourth embodiment of this invention is a time function.

For example, FIG. 10 shows one example of a case where the correction value E is a time function. A time function 72 is a time function that takes a convex shape upward, and a time function 73 is a time function that increases linearly along with lapse of time. Further, a time function 75 is a time function that takes a convex shape downward. Actually, as the calculation is carried out corresponding to the detection interval T, a time function takes a staged shape as shown by a time function 74. Any one of the time functions 72 to 75 reaches a constant final value E0 at a point of time t0. Thus, it is possible to relax a sudden increase in the regeneration clock frequency due to the addition of the correction value E.

According to the above-described fourth embodiment, as the correction value E is added to the buffer remaining volume H after the convergence, the buffer remaining volume H finally fluctuates substantially around the center value C. As a result, there is an effect that it is possible to suppress to a minimum limit the aggravation in the probabilities of the occurrence of an overflow and an underflow of the source clock regeneration buffer 23, that is, the reduction in the fluctuation proof against the delay fluctuation of the reception cells.

Next, a fifth embodiment of this invention will be explained. The structure of this fifth embodiment is similar to that of the first to the fourth embodiments, and the structure and the operation of the operation control section 5 are different from those of the first to the fourth embodiments, like the second to the fourth embodiments.

In the fifth embodiment, after the processing of the fourth embodiment has been executed, that is, after a predetermined condition has been satisfied, the equation for calculating the control value U is changed from equation (1) to equation (5). Thereafter, when a predetermined condition has been further satisfied, the processing after satisfying the predetermined conditions in the first to the third embodiments is carried out, that is, from the view point of the importance of the frequency stability, the change of the equation including the sensitivity A and the change of the average modulus N and the detection interval T of the buffer remaining volume H are executed.

For example, when a predetermined condition has been satisfied in a state that the control value U has been calculated using equation (5) and it has been output, the equation is changed to equation (6) that adds the correction value D to the equation (5) corresponding to the equation (3).

Control value $U$=sensitivity $A \times$(weighted average value $M$ of (buffer remaining volume $H$–center value $C$+correction value $E$))+offset value $B$+correction value $D$     (6)

In this case, the correction value D in equation (6) is exactly the same as the correction value D in equation (3), and this is obtained from equation (4). The processing for changing from equation (5) to equation (6) is the same as the processing for changing from equation (1) to equation (3).

The operation control section 5 instructs (a first instruction for change) to change the equation from equation (1) to equation (5) when one of the following is satisfied: that the constant time P measured by the timer 6 has passed; that the frequency variable range of the local clock 44 detected by the frequency variation detecting section 5 has become equal to or lower than the predetermined threshold value G; and that either the constant time P has passed or the frequency variable range has become equal to or lower than the predetermined threshold value G. The operation control section 5 does not instruct to change the average modulus N and the detection interval T. Thereafter, the operation control section 5 instructs again (a second instruction for change) to change the equation from equation (5) to equation (6) when one of the following is satisfied: that the constant time P measured by the timer 6 has passed; that the frequency variable range of the local clock 44 detectedby the frequency variation detecting section 5 has become equal to or lower than the predetermined threshold value G; and that either the constant time P has passed or the frequency variable range has become equal to or lower than the predetermined threshold value G. The operation control section 5 also instructs to change the average modulus N and the detection interval T.

Like in the second and the third embodiments, this frequency variable range may be defined as a difference between a maximum value and a minimum value of the frequency of the local clock 44 within the observation time that is repeated at a constant interval, such as, for example, the intervals of the generation of the operation execution instruction from the timer 4. Alternatively, the frequency variable range may be defined as a simple difference between the frequency at the time of starting the observation time and the frequency at the time of finishing this observation or at the next starting time. A system design engineer suitably determines the definition of this frequency variable range to match the system applied. The threshold value G of the frequency variable range of the source clock 14 and the time constant P are held by the operation control section 5.

The operating section 2 that has received the first change instruction latches the weighted average value M at this time as the correction value E, and changes the equation for calculating the control value U from equation (1) to equation (5). Further, the operating section 2 that has received the second change instruction latches the weighted average value M at this time as M0 in equation (4), and at the same time, changes the equation for calculating the control value U from equation (5) to equation (6). However, the weighted average value M latched at the first reception time, that is, the correction value E, may be used as M0, instead of using the value latched at the time of receiving the second change instruction.

Figure 11:
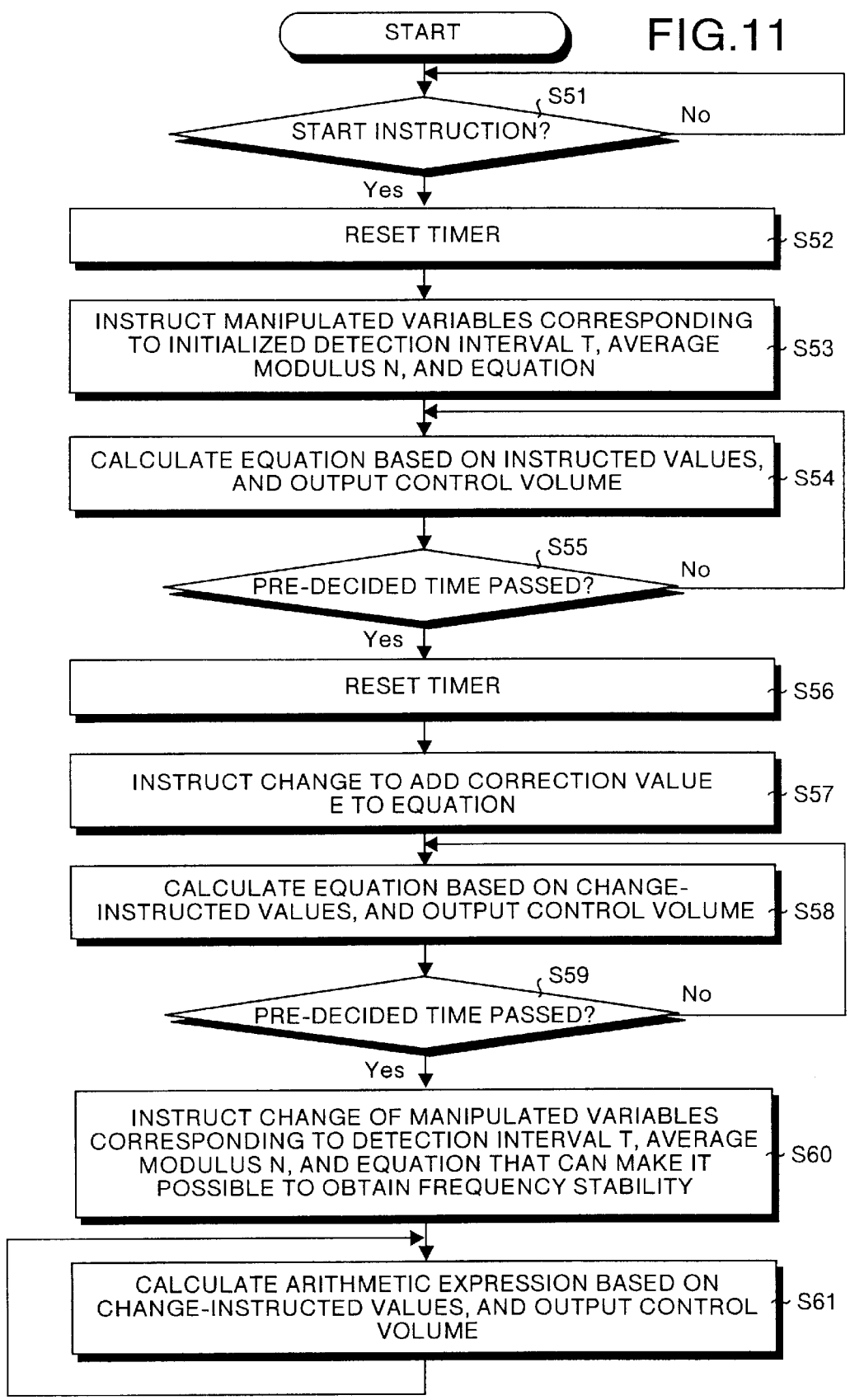
FIG. 11 is a flowchart showing a series of control processing procedures of a control-voltage calculating section in a fifth embodiment of this invention.

A series of control processing procedures of the control-voltage calculating section 1 will be explained below with reference to a flowchart shown in FIG. 11. In this case, the processing is carried out based on a predetermined condition that the constant time P shown in the first embodiment passes. The predetermined conditions shown in the second to the fourth embodiments may also be employed.

First, the operation control section 5 makes a decision as to whether the start instruction S from the buffer-remaining volume monitoring section 12 has been received or not (step S51) When the start instruction S has been received (step S51, YES), the operation control section 5 resets the timer 6 (step S52), and starts the measuring of the constant time P. Thereafter, the operation control section 5 instructs the initialized detection interval T to the timer 4, and instructs the average modulus N and equation (1) including the sensitivity A to the operating section 2 (step S53).

Thereafter, the operating section 2 solves equation (1) based on the instructed values, at the time of instructing the execution of the operation at every detection interval T input from the timer 4, and outputs the control volume U to the D/A converter 3 (step S54). Thereafter, the operation control section 5 makes a decision as to whether the time measured by the timer 6 has passed the constant time P or not (step S55). When the constant time P has not passed (step S55, NO), the process proceeds to step S54 and the output processing of the control volume U is repeated.

On the other hand, when the constant time P has passed (step S55, YES), the operation control section 5 sends an instruction to the operating section 2 to change from equation (1) to equation (5) that adds the correction value E to the buffer remaining volume H after resetting the timer 4 (step 46), and does not instruct to change the detection interval T and the average modulus N (step S57). Thereafter, the operating section 2 solves equation (5) based on the change-instructed values, and outputs the control volume U that is a result of the calculation, to the D/A converter 3 (step S58). Thereafter, the operation control section 5 further makes a decision as to whether the time measured by the timer 6 has passed the constant time P or not (step S59). When the constant time P has not passed (step S59, NO), the process proceeds to step S58 and the output processing of the control volume U is repeated.

On the other hand, when the constant time P has passed (step S59, YES), the operation control section 5 sends an instruction to the operating section 2 to change from equation (5) to equation (6) that adds the correction value D, and at the same time, instructs to change the detection interval T and the average modulus N (step S60). Thereafter, the operating section 2 solves equation (6) based on the change-instructed values, and outputs the control volume U that is a result of the calculation, to the D/A converter 3 (step S61), and repeats this processing.

The control value U as a digital value obtained in the above-described manner is converted into a control voltage V as an analog value by the D/A converter 3, and a result is used for increasing or decreasing the frequency of the local clock 44 that is an output of the voltage control crystal oscillator 13.

The local clock 44 that has been frequency-synchronized with the source clock 43 by the source clock frequency regeneration operation of the above-described source clock regenerating section 10 is output from the voltage control crystal oscillator 13. Based on this local clock 44, the buffer control section 11 outputs a read signal to the source clock regeneration buffer 23, thereby to read the ATM cell from the source clock regeneration buffer 23.

The change in the regeneration clock frequency in relation to the lapse time in the fifth embodiment is similar to that of the fourth embodiment shown in FIG. 9. Like in the fourth embodiment, the correction value E is not limited to a constant but may also be of a time function that the value increases step by step along with the lapse of time and becomes constant at a certain point of time (a final value).

According to the above-described fifth embodiment, as the processing of one of the first to the third embodiments is executed continuously after executing the processing of the fourth embodiment, the buffer remaining volume H finally fluctuates substantially around the center value C. Therefore, it is possible to suppress to a minimum limit the aggravation in the probabilities of the occurrence of an overflow and an underflow of the source clock regeneration buffer 23. Further, a system design engineer can select with some degree of freedom the convergence time of the local clock 44 and the frequency stability after the convergence. As a result, there is an effect that it is possible to obtain a value that is optimum for the ATM communication system applied.

Next, a sixth embodiment of this invention will be explained. This sixth embodiment is characterized in that when it has been detected that the frequency variable range of the local clock 14 has exceeded a threshold value G2 after executing the processing of one of the first to the fifth embodiments (after convergence), the equation for calculating the control value U and the values of various parameters are returned to the initial state of immediately after starting the clock regeneration operation, and then the processing of any one of the first to the fifth embodiments is executed, and the above operation is repeated.

Figure 12:
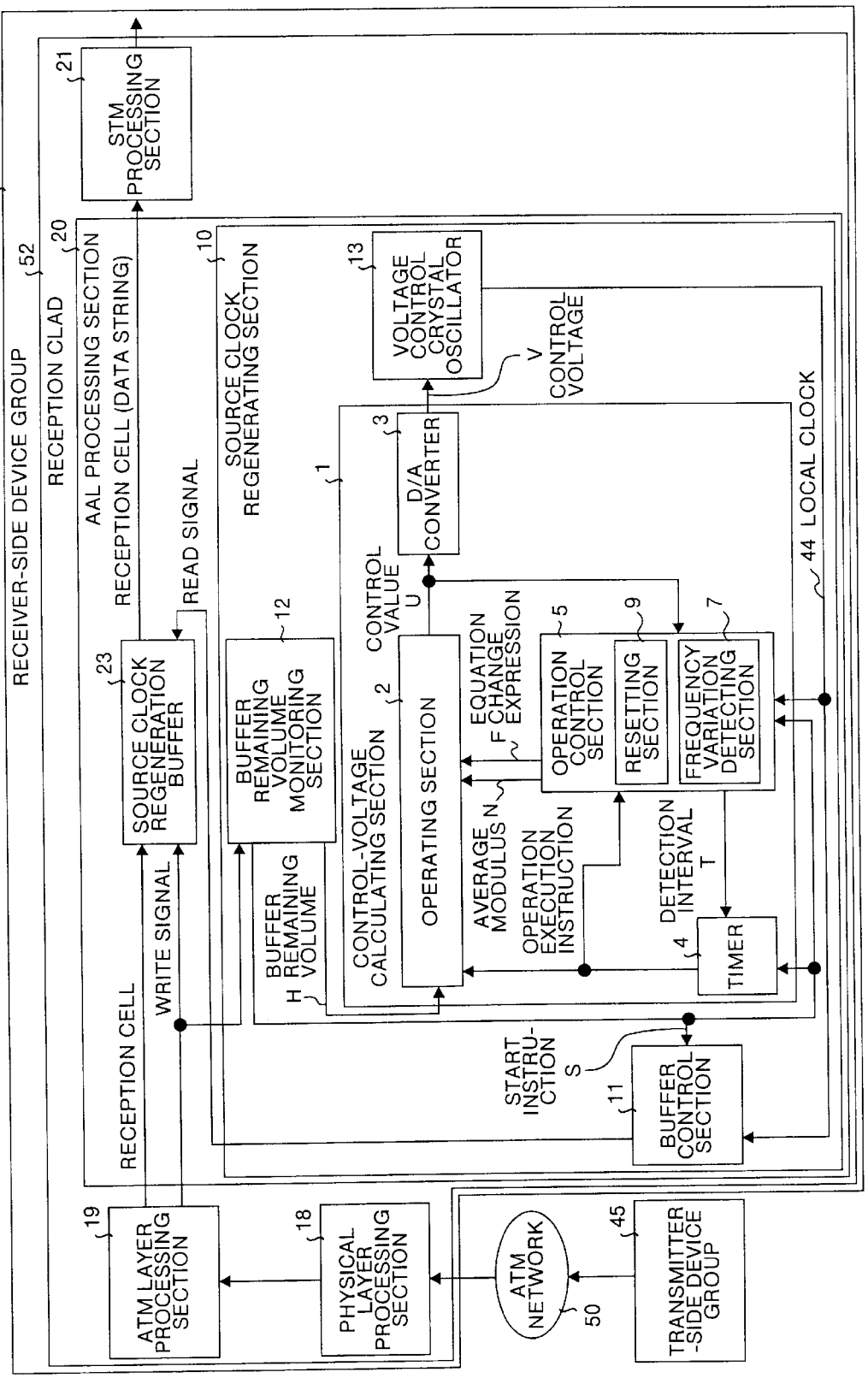
FIG. 12 is a functional configuration block diagram of an ATM communication system including a data receiving apparatus as a sixth embodiment of this invention.

FIG. 12 is a functional configuration block diagram of an ATM communication system including a data receiving apparatus as a sixth embodiment of this invention. The ATM communication system shown in FIG. 12 has a structure similar to that of the conventional ATM communication system shown in FIG. 16 to FIG. 19, but the internal structure of a control-voltage calculating section 1 is different from that of the conventional ATM communication system. Structural elements identical with those of the conventional ATM communication system are attached with identical symbols.

The operation control section 5 is the same as that of the first to the fifth embodiments in that, the equation including the sensitivity A is changed (including the changes of the correction value D and the correction value E), and the average modulus N and the detection interval T are changed, at a point of time when a decision has been made that the local clock 14 has converged by satisfying the above-described predetermined condition, after the clock regeneration operation has been started. The operation control section 5 has a resetting section 9. Thereafter, when it has been further detected that the frequency variable range of the local clock 14 has become equal to or larger than a threshold value G2, the resetting section 9 returns the equation including the sensitivity A, the average modulus N, and the detection interval T again to the initial values of immediately after starting the clock regeneration operation, and deletes the addition of the correction value D and the correction value E. In other words, the equation for calculating the control value U is returned to equation (1). Then, the operation of executing the processing of any one of the first to the fifth embodiments is repeated.

Like in the second embodiment, this frequency variable range may be defined as a difference between a maximum value and a minimum value of the frequency of the local clock 44 within the observation time that is repeated at a constant interval, such as, for example, the intervals of the generation of the operation execution instruction from the timer 4. Alternatively, the frequency variable range may be defined as a simple difference between the frequency at the time of starting the observation time and the frequency at the time of finishing this observation or at the next starting time. A system design engineer suitably determines the definition of this frequency variable range to match the system applied. The threshold value G of the frequency variable range of the source clock 14, the threshold value G2, and the constant time P are held by the operation control section 5.

The threshold value C of the frequency variable range of the local clock 44 used in the first to the fifth embodiments and the threshold value G2 used in the sixth embodiment may be the same value or may be different values.

Figure 13:
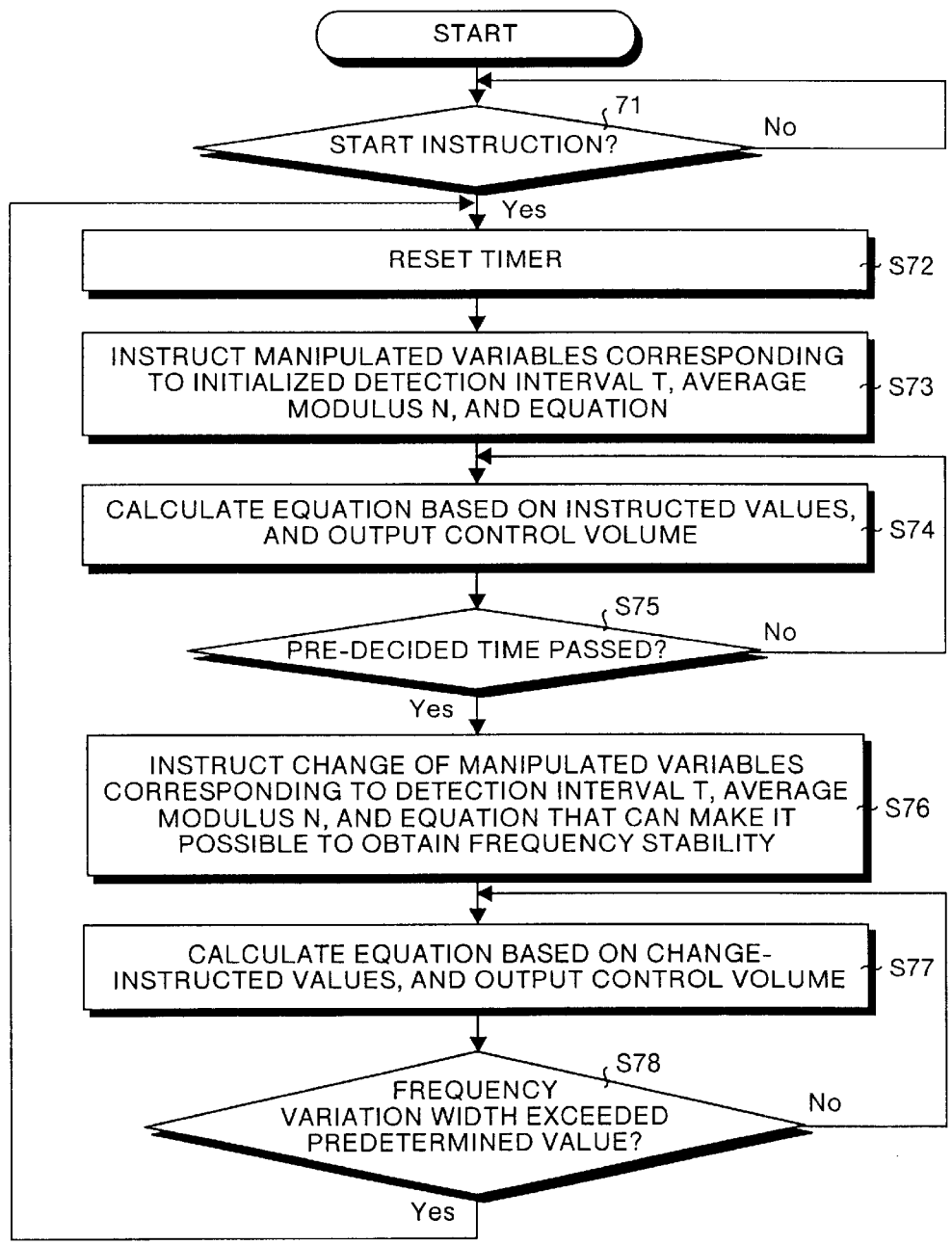
FIG. 13 is a flowchart showing a series of control processing procedures of a control-voltage calculating section in the sixth embodiment of this invention.
Figure 14:
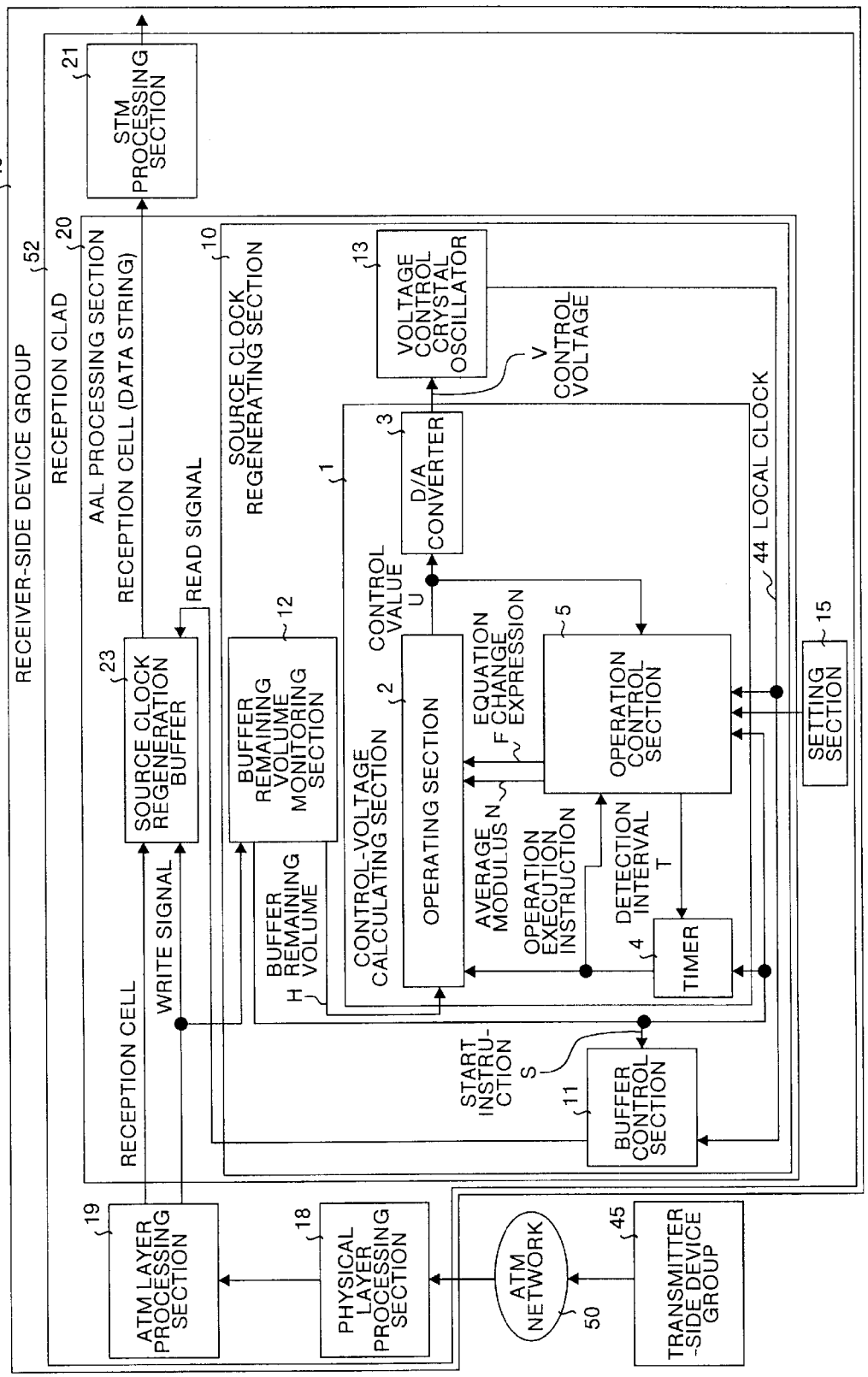
FIG. 14 is a functional configuration block diagram of an ATM communication system including a data receiving apparatus as a seventh embodiment of this invention.
Figure 15:
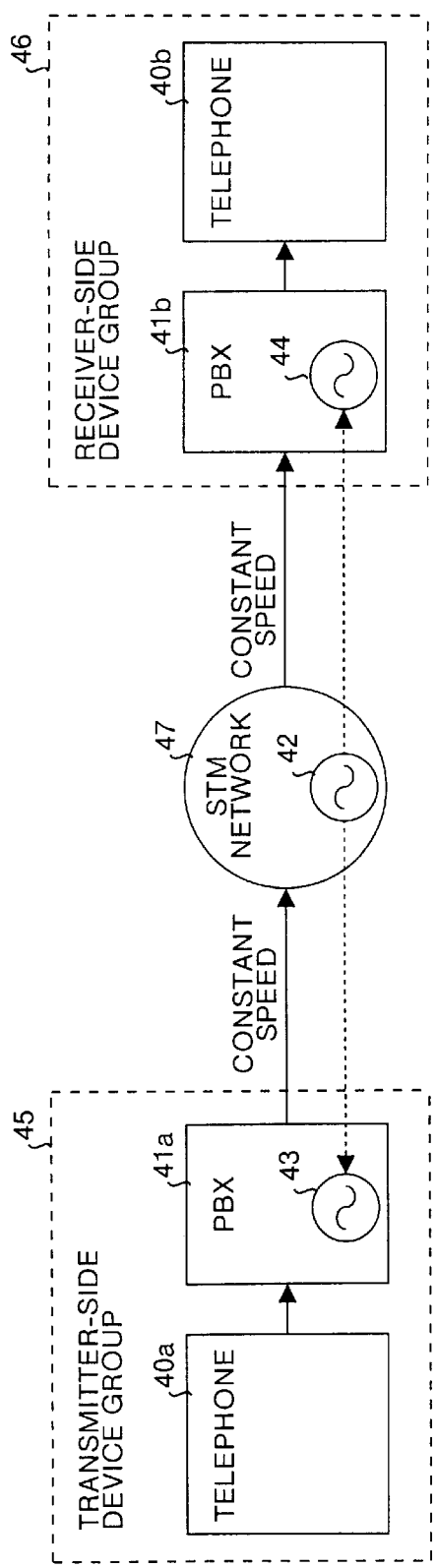
FIG. 15 is a communication system configuration diagram for realizing a telephone service in an STM network.
Figure 16:
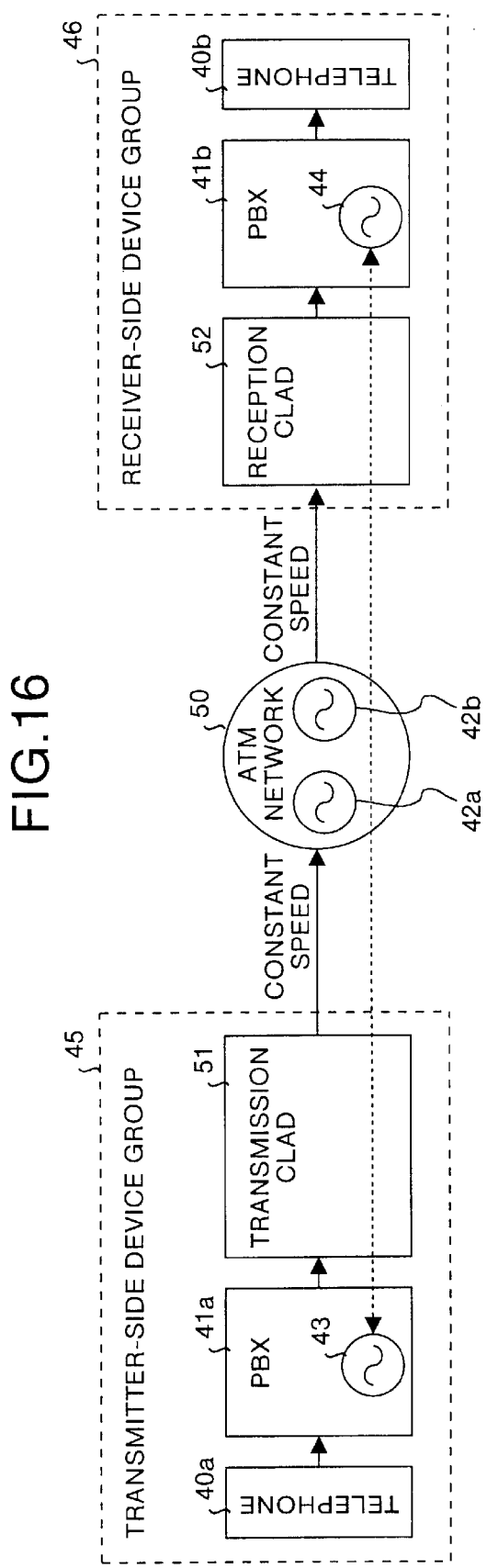
FIG. 16 is a communication system configuration diagram for realizing a telephone service in an ATM network.
Figure 17:
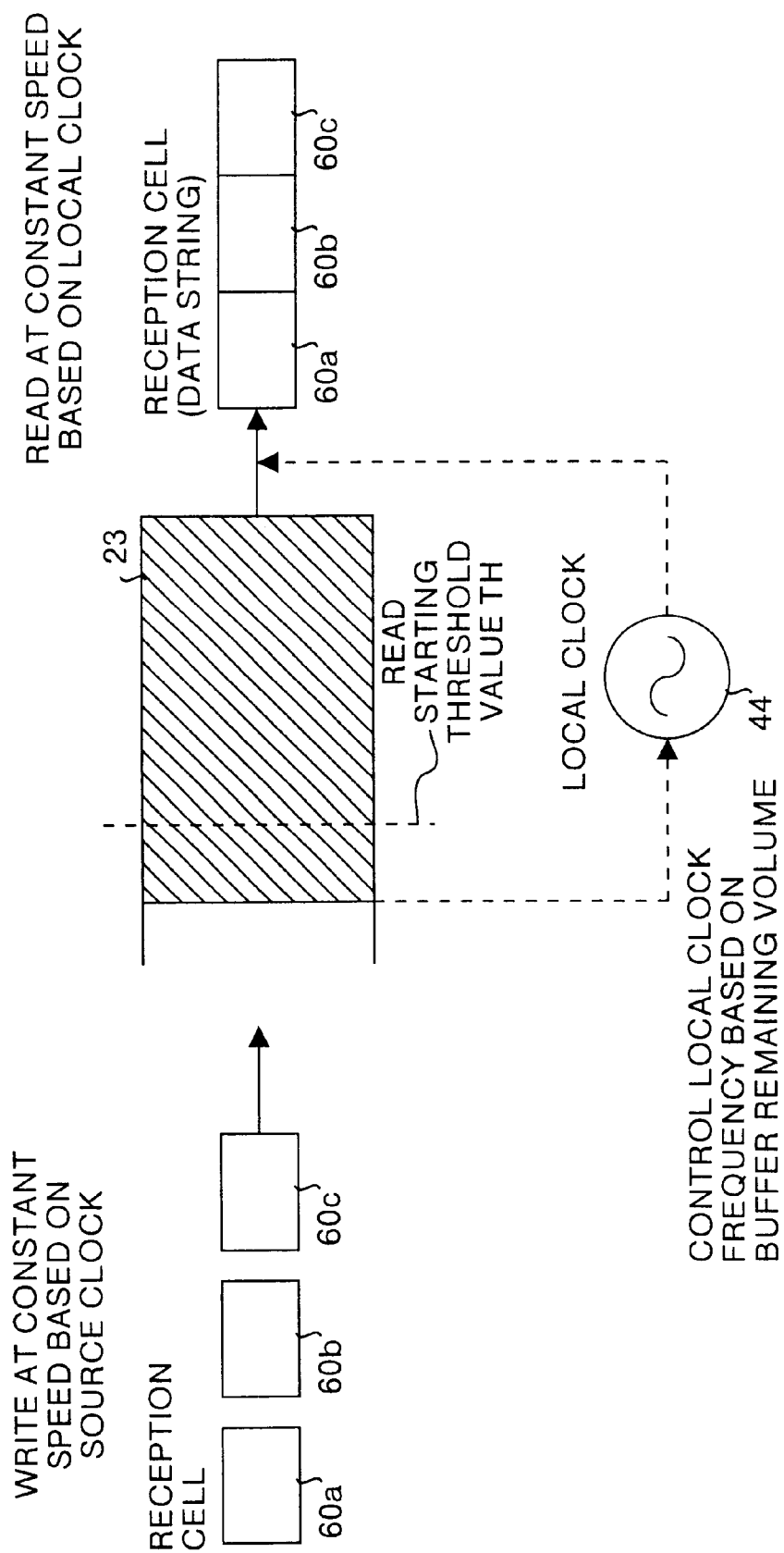
FIG. 17 is an explanatory diagram for explaining the concept of the operation of an Adaptive clock method.
Figure 18:
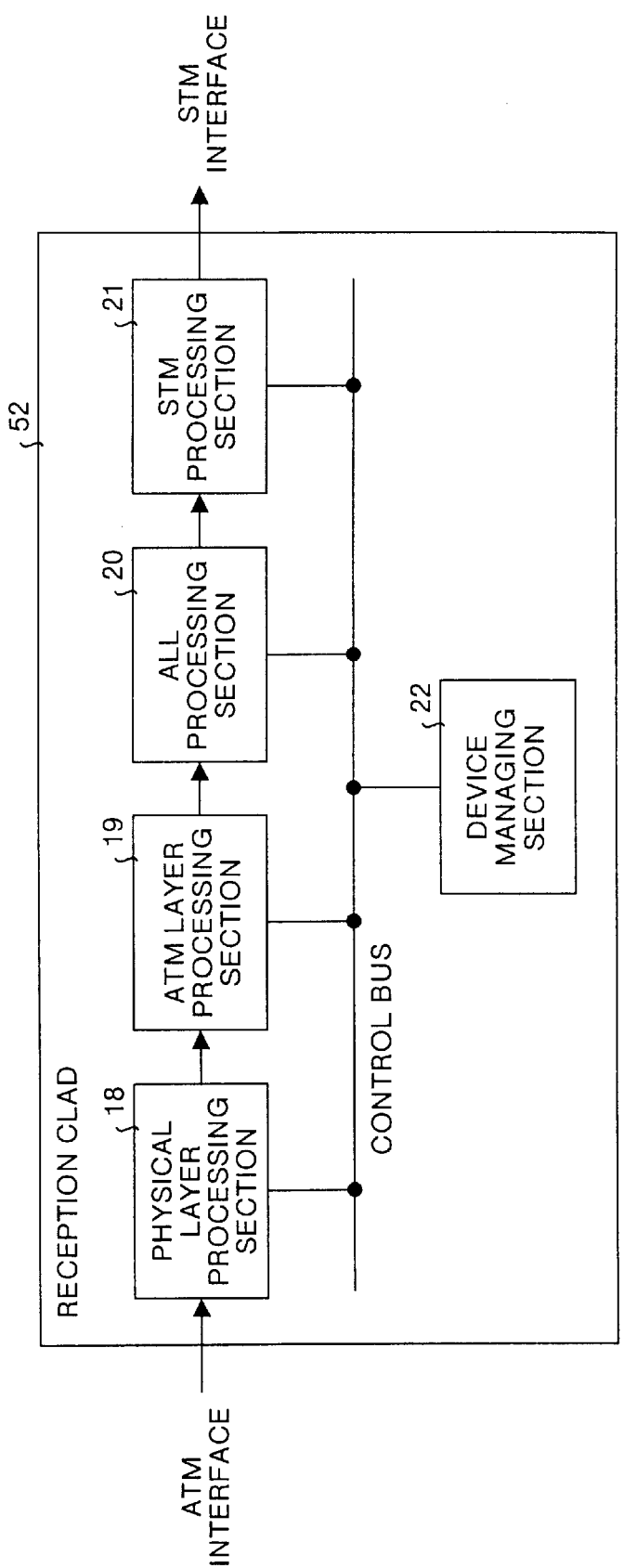
FIG. 18 is a block diagram showing a detailed configuration of a reception CLAD having a source clock frequency regeneration function.
Figure 19:
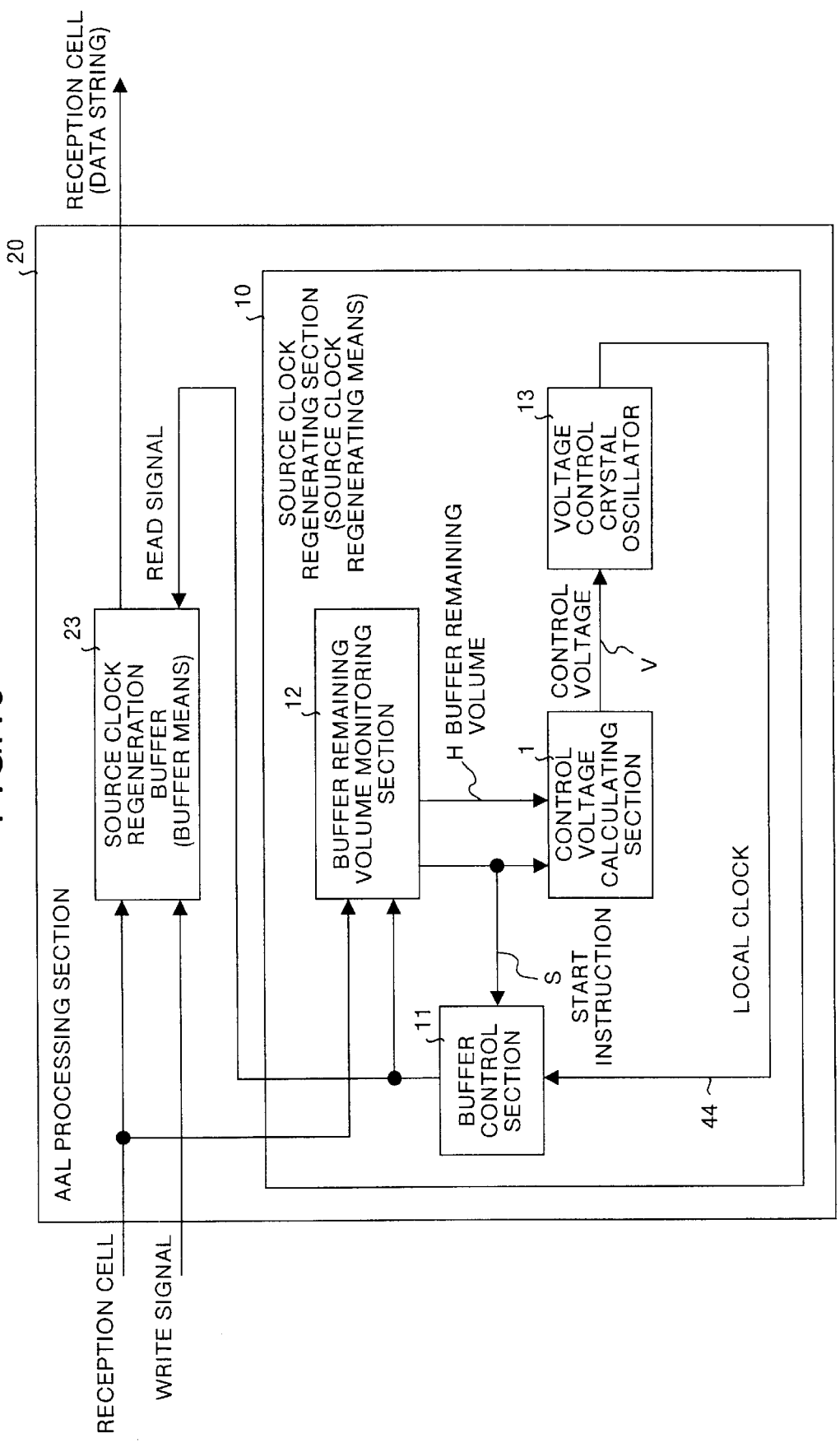
FIG. 19 is a block diagram showing a ailed configuration of the AAL processing section.
Figure 20:
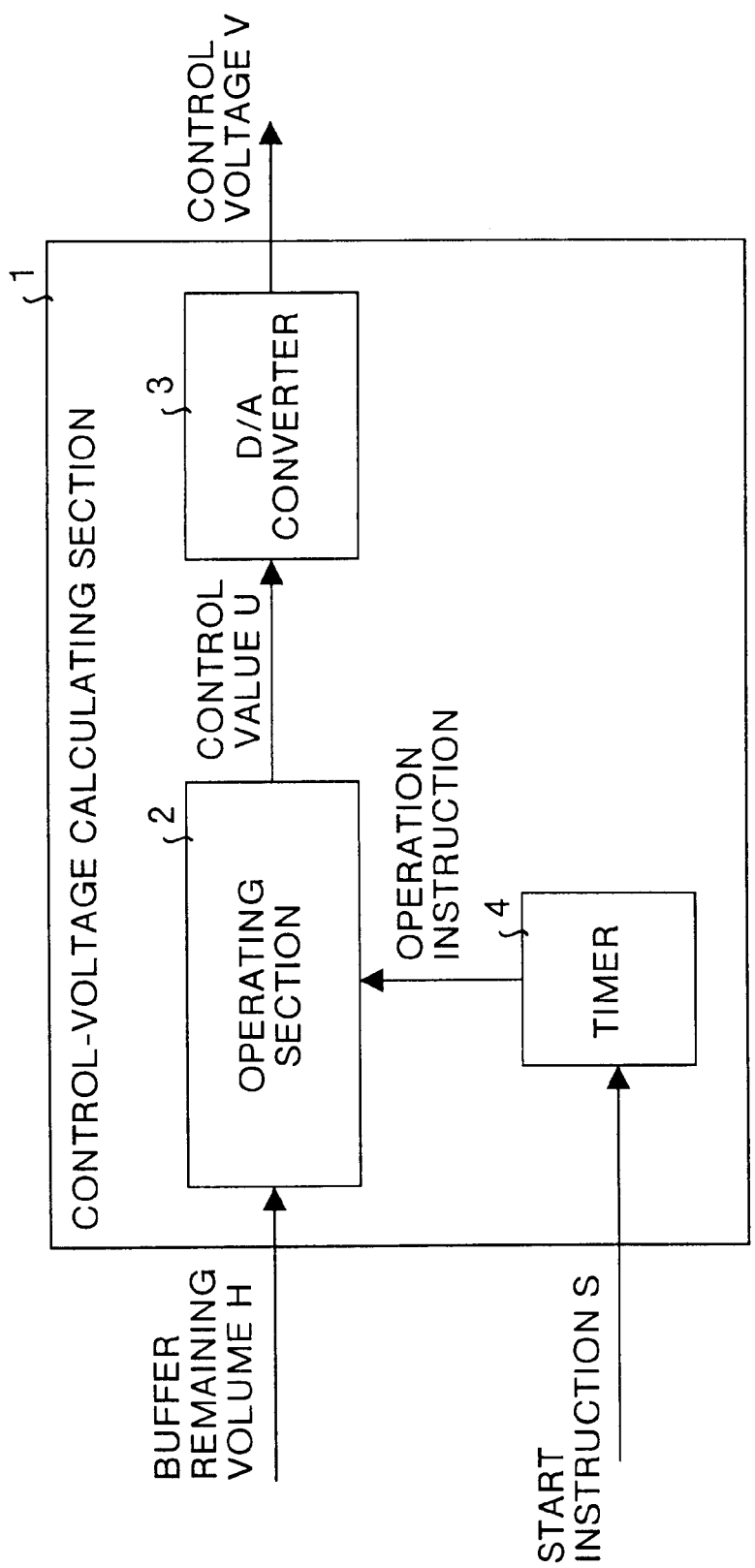
FIG. 20 is a block diagram showing a detailed configuration of the control-voltage calculating section.

A series of control processing procedures of the control-voltage calculating section 1 will be explained below with reference to a flowchart shown in FIG. 13. First, the operation control section 5 makes a decision as to whether the start instruction S from the buffer-remaining volume monitoring section 12 has been received or not (step S71). When the start instruction S has been received (step S71, YES), the operation control section 5 resets the timer 6 (step S72), and starts the measuring of the constant time P. Thereafter, the operation control section 5 instructs the initialized detection interval T to the timer 4, and instructs the average modulus N and equation (1) including the sensitivity A to the operating section 2 (step S73).

Thereafter, the operating section 2 solves equation (1) based on the instructed values, at the time of instructing the execution of the operation at every detection interval T input from the timer 4, and outputs the control volume U to the D/A converter 3 (step S74). Thereafter, the operation control section 5 makes a decision as to whether the time measured by the timer 6 has passed the constant time P or not (step S75). When the constant time P has passed (step S75, YES), in order to obtain the frequency stability, the operation control section 5 sends to the operating section 2 the equation change instruction F including the sensitivity A, that is, the instruction for making small the sensitivity A and the instruction for changing the equation from equation (1) to equation (3), and at the same time, instructs the changing of the detection interval T and the average modulus N, to the timer 4 and the operating section 2 respectively (step S76). When the constant time P has not passed (step S75, NO), the process proceeds to step S74, and the outputting of the control value U is continued.

Thereafter, the operating section 2 solves equation (3) based on the change-instructed values, and outputs the control volume U that is a result of the calculation, to the D/A converter 3 (step S77). Thereafter, the resetting section 9 makes a decision as to whether the frequency variable range has exceeded the predetermined threshold value G2 or not (step S78). When the predetermined threshold value G2 has not been exceeded (step S78, NO), the process proceeds to step S77, and the processing of step 77 is repeated. When the predetermined threshold value G2 has been exceeded, the process proceeds to step S71, and the state returns to the clock regeneration start initial state.

The control value U as a digital value obtained in the above-described manner is converted into a control voltage V as an analog value by the D/A converter 3, and a result is used for increasing or decreasing the frequency of the local clock 44 that is an output of the voltage control crystal oscillator 13.

The local clock 44 that has been frequency-synchronized with the source clock 43 by the source clock frequency regeneration operation of the above-described source clock regenerating section 10 is output from the voltage control crystal oscillator 13. Based on this local clock 44, the buffer control section 11 outputs a read signal to the source clock regeneration buffer 23, thereby to read the ATM cell from the source clock regeneration buffer 23.

According to the above-described sixth embodiment, after the convergence, when the frequency variable range of the local clock 44 has exceeded the threshold value G2, the equation including the sensitivity A, the average modulus N, and the detection interval T of the buffer remaining volume are returned to the initial values. Then, the processing of any one of the first to the fifth embodiments is executed. Therefore, it is possible to obtain effects similar to those of the first to the fifth embodiments. Further, even if the frequency of the source clock 43 has changed substantially, the frequency of the local clock 44 can follow quickly.

Further, as the addition of the correction value E is stopped when the frequency variable range of the local clock 44 has exceeded the threshold value G2, there is an effect that it is possible to easily obtain a new correction value E after a re-convergence.

A seventh embodiment of this invention will be explained next. In the first to the sixth embodiments, the equation including the sensitivity A, the average modulus N, the detection interval T of the buffer remaining volume H, the constant time P, the threshold value G of the frequency variable range, and the threshold value G2 are held within the operation control section 5. In the seventh embodiment, a setting section 15 is provided, and this setting section 15 can carry out a flexible setting.

The setting section 15 may set these set values as dip switch setting, or may set them via a control bus not shown from within the device managing section 22. Further, an own setting panel may be provided. Based on this setting section 15, it becomes possible to selectively set from the first to the sixth embodiments. It is also possible to combine the setting from the first to the sixth embodiments.

According to the seventh embodiment, there is an effect that it is possible to flexibly carry out a desired setting regarding the regeneration of the local clock 44. In the first to the seventh embodiments, a data interface width between the functional blocks is set to eight bits, and data is transferred in byte unit. However, it is also possible to obtain similar effects based on a different data interface width and a different transfer unit.

In the above first to the seventh embodiments, the STM interface speed, that is, the frequency of the source clock 43, is set to 1.544 MHz±100 ppm, and the ATM interface speed, that is, the frequency of the network clocks 42a and 42b is set to 155.52 MHz. However, it is also possible to set a different frequency or a different modulation width. Further, in the above first to the seventh embodiments, the ATM cell is used as a basic transfer unit of the sound data. However, as the clock regeneration is basically carried out based on the buffer remaining volume H, it is possible to obtain similar effects when a packet of different kind and a different length other than the ATM cell is used as a transfer unit.

Further, the above first to the seventh embodiments are based on the ATM communication system for connecting the telephones 40a and 40b and the PBX's 41a and 41b via the ATM network 50, as a concrete example. However, its also possible to obtain similar effects when a system of other structure is used if the system requires a regeneration of the source clock frequency according to the Adaptive clock method. Further, while the kind of data to be handled is the sound data in the first to the sixth embodiments, the data is not limited to the sound data, and data of a different kind may also be handled. Further, in the above first to the seventh embodiments, the calculation of the weighted average M is not limited to an arithmetic mean, this calculation may also be a geometric mean, an exponential mean, a median, a mode, a mid range, etc.

As explained above, according to this invention, the operating unit takes a weighted average value of a plurality of buffer remaining volumes sequentially detected, and multiplies a predetermined sensitivity coefficient to this weighted average value, and further adds a predetermined offset value, thereby to obtain a control value for regenerating the source clock. In this case, the control unit sets a regeneration clock to a manipulated variable to be used for calculating the control value capable of converging to the source clock at a high speed during a period from when a source clock regeneration operation has started till when the regeneration clock satisfies a predetermined condition for coming closer to the source clock frequency, and sets the regeneration clock to the manipulated variable capable of stably regenerating the source clock after this predetermined condition has been satisfied, thereby regenerating the source clock. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit.

According to the next invention, a high-speed convergence to the source clock frequency is carried out until when a constant time counted by the timer has passed, and a clock regeneration control of high frequency stability is carried out by the lapse of this constant time. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit.

According to the next invention, a high-speed convergence to the source clock frequency is carried out until when the frequency variation range of the regeneration clock becomes equal to or lower than a predetermined value. A clock regeneration control of high frequency stability is carried out when the frequency variation range of the regeneration clock has become equal to or lower than the predetermined value. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit.

According to the next invention, a high-speed convergence to the source clock frequency is carried out until when one of the conditions that a constant time passes and that the frequency variation range of the regeneration clock becomes equal to or lower than a predetermined value is satisfied. A clock regeneration control of high frequency stability is carried out after one of the conditions has been satisfied. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit.

According to the next invention, before satisfying the predetermined condition, the sensitivity coefficient is set large so that the convergence time becomes short. After the predetermined condition has been satisfied, the sensitivity coefficient is set small, and at the same time a predetermined correction value is further added to the offset value, thereby carrying out a source clock regeneration control of high frequency stability. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit. Further, as the desired correction value is added, a system design engineer can select with some degree of freedom the convergence time of the local clock and the frequency stability after the convergence. As a result, there is an effect that it is possible to obtain a value that is optimum for the ATM communication system applied.

According to the next invention, the weight of the buffer remaining volume at the latest side is set small from out of the plurality of buffer remaining volumes used for the calculation of the weighted average value, after the predetermined condition has been satisfied. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit. Further, as the weight of the buffer remaining volume can be set small, a system design engineer can select with some degree of freedom the convergence time of the local clock and the frequency stability after the convergence. As a result, there is an effect that it is possible to obtain a value that is optimum for the ATM communication system applied.

According to the next invention, a predetermined interval for detecting the buffer remaining volume is changed, after the predetermined condition has been satisfied. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit.

According to the next invention, a predetermined correction value is further added to the buffer remaining volume of the latest side out of the plurality of buffer remaining volumes used for the calculation of the weighted average value, after the predetermined condition has been satisfied. Therefore, there is an effect that it is possible to suppress to the minimum limit the influence that the source clock frequency gives to the fluctuation proof.

According to the next invention, the correction value is a time threshold value that changes along with a lapse of time toward a final value after the final value has been decided. Therefore, there is an effect that at the time of suppressing the influence given to the fluctuation proof to the minimum limit, it is possible to mitigate a rapid increase in the frequency.

According to the next invention, a multiplication value of the sensitivity coefficient, the average modulus, and the predetermined interval is set to a constant value corresponding to an optimum value. Therefore, there is an effect that it is possible to satisfy both the desired convergence time and the frequency stability.

According to the next invention, the control unit carries out a plurality of processing in combination from out of the processing of setting the sensitivity coefficient to a small value and at the same time further adding a predetermined correction value to the offset value, the processing of setting small the weight of the buffer remaining volume at the latest side out of the plurality of buffer remaining volumes used for the calculation of the weighted average value, the processing of changing a predetermined interval for detecting the buffer remaining volume, and the processing of further adding a predetermined correction value to the buffer remaining volume of the latest side out of the plurality of buffer remaining volumes used for the calculation of the weighted average value, after the predetermined condition has been satisfied. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit. Further, as the desired correction value is added, a system design engineer can select with some degree of freedom the convergence time of the local clock and the frequency stability after the convergence. As a result, there is an effect that it is possible to obtain a value that is optimum for the ATM communication system applied. Further, there is an effect that it is possible to suppress to the minimum limit the influence that the source clock frequency gives to the fluctuation proof.

According to the next invention, the control unit adds a predetermined correction value to the buffer remaining volume of the latest side out of the plurality of buffer remaining volumes used for the calculation of the weighted average value, after the predetermined condition has been satisfied, and carries out one or more processing in combination from out of the processing of setting the sensitivity coefficient to a small value and at the same time further adding a predetermined correction value to the offset value, the processing of setting small the weight of the buffer remaining volume at the latest side out of the plurality of buffer remaining volumes used for the calculation of the weighted average value, and the processing of changing a predetermined interval for detecting the buffer remaining volume, after the predetermined condition has been satisfied. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit. Further, as the desired correction value is added, a system design engineer can select with some degree of freedom the convergence time of the local clock and the frequency stability after the convergence. As a result, there is an effect that it is possible to obtain a value that is optimum for the ATM communication system applied. Further, there is an effect that it is possible to suppress to the minimum limit the influence that the source clock frequency gives to the fluctuation proof.

According to the next invention, when the frequency variation range of the regeneration clock has exceeded a predetermined value, the control unit returns the regeneration clock to an initial set state before starting the source clock regeneration operation, sets the regeneration clock to a manipulated variable to be used for calculating the control value capable of converging the source clock at a high speed during a period from this initial set state till when a regeneration clock satisfies a predetermined condition for coming closer to the source clock frequency, and sets the regeneration clock to the manipulated variable capable of stably regenerating the source clock after this predetermined condition has been satisfied. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit. Further, as the desired correction value is added, a system design engineer can select with some degree of freedom the convergence time of the local clock and the frequency stability after the convergence. As a result, there is an effect that it is possible to obtain a value that is optimum for the ATM communication system applied. Particularly, there is an effect that it is possible to make the local clock frequency follow quickly when the source clock has varied substantially.

According to the next invention, the setting unit is used and, the setting unit sets the contents of the setting control that the control unit carries out. Therefore, a system design engineer can select with some degree of freedom the convergence time of the local clock and the frequency stability after the convergence. As a result, there is an effect that it is possible to obtain a value that is optimum for the ATM communication system applied.

According to the next invention, first, a weighted average of a plurality of buffer remaining volumes sequentially detected is taken during a period from when a source clock regeneration operation has been stated till when a regeneration clock has satisfied a predetermined condition for coming closer to the source clock, then a predetermined coefficient is multiplied to this weighted average value, further a predetermined offset value is added thereby to obtain a control value for regenerating the source clock, the calculated control value is output and the frequency of the regeneration clock is converged to the source clock at a high speed, and next, a manipulated variable to be used for the calculation of the control value is changed after satisfying the predetermined condition, and the regeneration of the frequency of the regeneration clock is stably controlled. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit.

According to the next invention, a high-speed convergence to the source clock frequency is carried out until when a constant time counted by the timer has passed, and a clock regeneration control of high frequency stability is carried out by the lapse of this constant time. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit.

According to the next invention, a high-speed convergence to the source clock frequency is carried out until when the frequency variation range of the regeneration clock becomes equal to or lower than a predetermined value. A clock regeneration control of high frequency stability is carried out when the frequency variation range of the regeneration clock has become equal to or lower than the predetermined value. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit.

According to the next invention, a high-speed convergence to the source clock frequency is carried out until when one of the conditions that a constant time passes and that the frequency variation range of the regeneration clock becomes equal to or lower than a predetermined value is satisfied. A clock regeneration control of high frequency stability is carried out after one of the conditions has been satisfied. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit.

According to the next invention, the change setting of the manipulated volume at the second step is setting the sensitivity coefficient to a small value and at the same time further adding a predetermined correction value to the offset value. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit. Further, as the predetermined correction value is added, a system design engineer can select with some degree of freedom the convergence time of the local clock and the frequency stability after the convergence. As a result, there is an effect that it is possible to obtain a value that is optimum for the ATM communication system applied.

According to the next invention, the change setting of the manipulated volume at the second step is setting small the weight of the buffer remaining volume at the latest side out of the plurality of buffer remaining volumes used for the calculation of the weighted average value. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit. Further, as the weight of the buffer remaining volume can be set small, a system design engineer can select with some degree of freedom the convergence time of the local clock and the frequency stability after the convergence. As a result, there is an effect that it is possible to obtain a value that is optimum for the ATM communication system applied.

According to the next invention, the change setting of the manipulated volume at the second step is changing a predetermined interval for detecting the buffer remaining volume. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit.

According to the next invention, the change setting of the manipulated volume at the second step is further adding a predetermined correction value to the buffer remaining volume of the latest side out of the plurality of buffer remaining volumes used for the calculation of the weighted average value. Therefore, there is an effect that it is possible to suppress to the minimum limit the influence that the source clock frequency gives to the fluctuation proof.

According to the next invention, the correction value is a time threshold value that changes along with a lapse of time toward a final value after the final value has been decided. Therefore, there is an effect that at the time of suppressing the influence given to the fluctuation proof to the minimum limit, it is possible to mitigate a rapid increase in the frequency.

According to the next invention, the manipulation volume sets a multiplication value of the sensitivity coefficient, an average modulus for prescribing the weighted average calculation of the plurality of buffer remaining volumes, and the predetermined interval, to a constant value corresponding to an optimum value. Therefore, there is an effect that it is possible to satisfy both the desired convergence time and the frequency stability, and it is not necessary to make large the average modulus and the detection interval.

According to the next invention, the second step is the process of carrying out two or more processing in combination from out of the processing of setting the sensitivity coefficient to a small value and at the same time further adding a predetermined correction value to the offset value, the processing of setting small the weight of the buffer remaining volume at the latest side out of the plurality of buffer remaining volumes used for the calculation of the weighted average value, the processing of changing a predetermined interval for detecting the buffer remaining volume, and the processing of further adding a predetermined correction value to the buffer remaining volume of the latest side out of the plurality of buffer remaining volumes used for the calculation of the weighted average value. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit. Further, as the desired correction value is added, a system design engineer can select with some degree of freedom the convergence time of the local clock and the frequency stability after the convergence. As a result, there is an effect that it is possible to obtain a value that is optimum for the ATM communication system applied. Further, there is an effect that it is possible to suppress to the minimum limit the influence that the source clock frequency gives to the fluctuation proof.

According to the next invention, the second step further adds a predetermined correction value to the buffer remaining volume of the latest side out of the plurality of buffer remaining volumes used for the calculation of the weighted average value, and the source clock regeneration method further comprises a third step of carrying out one or more processing in combination from out of the processing of setting the sensitivity coefficient to a small value and at the same time further adding a predetermined correction value to the offset value, the processing of setting small the weight of the buffer remaining volume at the latest side out of the plurality of buffer remaining volumes used for the calculation of the weighted average value, and the processing of changing a predetermined interval for detecting the buffer remaining volume, after the predetermined condition has been satisfied again. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit. Further, as the desired correction value is added, a system design engineer can select with some degree of freedom the convergence time of the local clock and the frequency stability after the convergence. As a result, there is an effect that it is possible to obtain a value that is optimum for the ATM communication system applied. Further, there is an effect that it is possible to suppress to the minimum limit the influence that the source clock frequency gives to the fluctuation proof.

According to the next invention, a regeneration clock is returned to an initial set state of before starting the source clock regeneration operation when the frequency variation range of the regeneration clock has exceeded a predetermined value after the predetermined condition has been satisfied, and thereafter further the first step, the second step or the third step is sequentially carried out. Therefore, it is possible to satisfy both the desired convergence time and the frequency stability, and it is not necessary to make large the average modulus and the detection interval. As a result, there is an effect that it is not necessary to make extremely large the scale of the operating circuit and the operation speed of the operating circuit. Further, as the desired correction value is added, a system design engineer can select with some degree of freedom the convergence time of the local clock and the frequency stability after the convergence. As a result, there is an effect that it is possible to obtain a value that is optimum for the ATM communication system applied.

Particularly, there is an effect that it is possible to make the local clock frequency follow quickly when the source clock has varied substantially.

According to the next invention, a recording medium is recorded with a program for making a computer execute one of the methods described in the above-described inventions. Therefore, there is an effect that, with the above arrangement, this program can be read by a machine so that the above-described operations of the inventions can be realized by computers.

INDUSTRIAL APPLICABILITY

As explained above, the data receiving apparatus, the method of regenerating a source clock to be used therefor, and the computer-readable recording medium recorded with a program for making a computer execute this method are for carrying out communications via an ATM (Asynchronous Transfer Mode) network, and can regenerate at a receiver side a source clock frequency of a transmitter side, can shorten a convergence time of a regeneration clock under a limit of the scale of the operating circuit or the operation speed of the operating circuit, and can increase the frequency stability after the convergence, particularly when the network clock and the source clock supplied to the transmitter side are mutually asynchronous or when the network clocks supplied to the transmitter side and the receiver side are mutually asynchronous, and are further suitable for suppressing the influence that the source clock frequency gives to the fluctuation proof to the minimum limit.

What is claimed is:

1. A data receiving apparatus comprising:

a buffer unit which holds data that has been transmitted from a data transmitting apparatus to a transfer network at a constant speed based on a source clock, and that is then received from the transfer network at a constant speed; and a source clock regenerating unit detects a buffer remaining volume that is a data volume held by said buffer unit, and regenerates the source clock according to this buffer remaining volume, wherein said source clock regenerating unit having, an operating unit which obtains a weighted average value of a plurality of buffer remaining volumes that have been sequentially detected, multiplies a predetermined sensitivity coefficient to this weighted average value, and adds a predetermined offset value, thereby to obtain a control value for regenerating the source clock; and a control unit which sets a regeneration clock to a manipulated variable to be used for calculating the control value capable of converging to the source clock at a high speed during a period from when a source clock regeneration operation has started till when the regeneration clock satisfies a predetermined condition for coming closer to the source clock frequency, and for setting the regeneration clock to the manipulated variable capable of stably regenerating the source clock after this predetermined condition has been satisfied.

2. The data receiving apparatus according to claim 1, wherein said control unit has a timer for counting a constant time, and the predetermined condition is a lapse of the constant time counted by said timer.

3. The data receiving apparatus according to claim 1, wherein, said control unit has a time measuring unit for counting a frequency variation range of the regeneration clock, and the predetermined condition is that the frequency variation range of the regeneration clock becomes equal to or lower than a predetermined value.

4. The data receiving apparatus according to claim 1, wherein, said control unit has a timer for counting a constant time and a time measuring unit for counting a frequency variation range of the regeneration clock, and the predetermined condition is to satisfy one of that the constant time counted by said timer has lapsed and that the frequency variation range of the regeneration clock becomes equal to or lower than a predetermined value.

5. The data receiving apparatus according to claim 1, wherein, said control unit sets the sensitivity coefficient to a small value and at the same time further adds a predetermined correction value to the offset value, after the predetermined condition has been satisfied.

6. The data receiving apparatus according to claim 1, wherein, said control unit sets small the weight of the buffer remaining volume at the latest side out of the plurality of buffer remaining volumes used for the calculation of the weighted average value, after the predetermined condition has been satisfied.

7. The data receiving apparatus according to claim 1, wherein, said control unit changes a predetermined interval for detecting the buffer remaining volume, after the predetermined condition has been satisfied.

8. The data receiving apparatus according to claim 1, wherein, said control unit further adds a predetermined correction value to the buffer remaining volume of the latest side out of the plurality of buffer remaining volumes used for the calculation of the weighted average value, after the predetermined condition has been satisfied.

9. The data receiving apparatus according to claim 8, wherein, the correction value is a time threshold value that changes along with a lapse of time toward a final value after the final value has been decided.

10. The data receiving apparatus according to claim 1, wherein, said control unit sets a multiplication value of the sensitivity coefficient, an average modulus for prescribing the weighted average calculation of the plurality of buffer remaining volumes, and the predetermined interval, to a constant value corresponding to an optimum value.

11. The data receiving apparatus according to claim 8, wherein, said control unit carries out a plurality of processing in combination from out of the processing of setting the sensitivity coefficient to a small value and at the same time further adding a predetermined correction value to the offset value, the processing of setting small the weight of the buffer remaining volume at the latest side out of the plurality of buffer remaining volumes used for the calculation of the weighted average value, the processing of changing a predetermined interval for detecting the buffer remaining volume, and the processing of further adding a predetermined correction value to the buffer remaining volume of the latest side out of the plurality of buffer remaining volumes used for the calculation of the weighted average value, after the predetermined condition has been satisfied.

12. The data receiving apparatus according to claim 11, wherein, said control unit adds a predetermined correction value to the buffer remaining volume of the latest side out of the plurality of buffer remaining volumes used for the calculation of the weighted average value, after the predetermined condition has been satisfied, and carries out one or more processing in combination from out of the processing of setting the sensitivity coefficient to a small value and at the same time further adding a predetermined correction value to the offset value, the processing of setting small the weight of the buffer remaining volume at the latest side out of the plurality of buffer remaining volumes used for the calculation of the weighted average value, and the processing of changing a predetermined interval for detecting the buffer remaining volume, after the predetermined condition has been satisfied.

13. The data receiving apparatus according to claim 1, wherein, when the frequency variation range of the regeneration clock has exceeded a predetermined value, said control unit returns the regeneration clock to an initial set state of before starting the source clock regeneration operation, sets the regeneration clock to a manipulated variable to be used for calculating the control value capable of converging the source clock at a high speed during a period from this initial set state till when the regeneration clock satisfies a predetermined condition for coming closer to the source clock frequency, and sets the regeneration clock to the manipulated variable capable of stably regenerating the source clock after this predetermined condition has been satisfied.

14. The data receiving apparatus according to claim 1 further comprising a setting unit for setting the contents of the setting control that said control unit carries out.

15. A source clock regeneration method for holding data that has been transmitted from a data transmitting apparatus to a transfer network at a constant speed based on a source clock and the data received from the transfer network at a constant speed, for detecting a buffer remaining volume that is a data volume held by the buffer unit, and for regenerating the source clock according to this buffer remaining volume, the source clock regeneration method comprising:

a first step of taking a weighted average of a plurality of buffer remaining volumes sequentially detected during a period from when a source clock regeneration operation has been stated till when a regeneration clock has satisfied a predetermined condition for coming closer to the source clock, multiplying a predetermined coefficient to this weighted average value, adding a predetermined offset value thereby to obtain a control value for regenerating the source clock, and outputting the calculated control value and converging the frequency of the regeneration clock to the source clock at a high speed; and a second step of change setting a manipulated variable to be used for the calculation of the control value after satisfying the predetermined condition, and stably controlling the regeneration of the frequency of the regeneration clock.

16. The source clock regeneration method according to claim 15, wherein the predetermined condition is a lapse of a constant time after the source clock regeneration operation has been started.

17. The source clock regeneration method according to claim 15, wherein the predetermined condition is that a frequency variation range of the regeneration clock becomes equal to or lower than a predetermined value.

18. The source clock regeneration method according to claim 15, wherein the predetermined condition is to satisfy one of that a constant time has passed after the source clock regeneration operation has been started and that a frequency variation range of the regeneration clock becomes equal to or lower than a predetermined value.

19. A recording medium recorded with a program for making a computer execute the method described in claim 15.

* * * * *